United States Patent
Jeon et al.

(10) Patent No.: US 12,452,730 B2
(45) Date of Patent: Oct. 21, 2025

(54) APPARATUS AND METHOD FOR FRONTHAUL TRANSMISSION IN WIRELESS COMMUNICATION SYSTEM

(71) Applicant: SAMSUNG ELECTRONICS CO., LTD., Suwon-si (KR)

(72) Inventors: Namryul Jeon, Suwon-si (KR); Wonwoo Rhim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 503 days.

(21) Appl. No.: 18/076,672

(22) Filed: Dec. 7, 2022

(65) Prior Publication Data

US 2023/0115400 A1   Apr. 13, 2023

Related U.S. Application Data

(63) Continuation of application No. PCT/KR2022/011318, filed on Aug. 1, 2022.

(30) Foreign Application Priority Data

Aug. 5, 2021   (KR) .......................... 1020210103451

(51) Int. Cl.
  *H04W 28/06*   (2009.01)
  *H04W 24/02*   (2009.01)
(52) U.S. Cl.
  CPC ................................ *H04W 28/065* (2013.01)
(58) Field of Classification Search
  CPC .... H04W 28/065; H04W 28/06; H04W 24/02
  See application file for complete search history.

(56) References Cited

U.S. PATENT DOCUMENTS

| | | |
|---|---|---|
| 2018/0042040 A1 | 2/2018 | Chen et al. |
| 2020/0204252 A1 | 6/2020 | Barbieri et al. |
| 2021/0006371 A1 | 1/2021 | Raghothaman et al. |
| 2021/0136790 A1* | 5/2021 | Bidkar ................ H04W 72/569 |
| 2023/0014537 A1* | 1/2023 | Berg ..................... H04L 5/0058 |

FOREIGN PATENT DOCUMENTS

| | | |
|---|---|---|
| WO | 2019/217391 | 11/2019 |
| WO | 2020/091655 | 5/2020 |

OTHER PUBLICATIONS

Extended European Search Report dated Sep. 18, 2024 issued in European Patent Application No. 22853397.2.
O-RAN Alliance, "O-RAN Fronthaul Control, User and Synchronization Plane Specification", 2021, 299 pages.

* cited by examiner

*Primary Examiner* — Kent Krueger
(74) *Attorney, Agent, or Firm* — Nixon & Vanderhye, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments, a method performed by a Distributed Unit (DU) may include: generating configuration information for packets used in uplink data transmission of a plurality of Radio Units (RUs) providing a shared cell, and transmitting the configuration information for packets to an RU among the plurality of RUs through a fronthaul interface. The configuration information for packets may include information for indicating the number of per-packet Physical Resource Blocks (PRBs) for the uplink packets.

20 Claims, 17 Drawing Sheets

APPARATUS AND METHOD FOR FRONTHAUL TRANSMISSION IN WIRELESS COMMUNICATION SYSTEM

CROSS-REFERENCE TO RELATED APPLICATIONS

This application is a continuation of International Application No. PCT/KR2022/011318 designating the United States, filed on Aug. 1, 2022, in the Korean Intellectual Property Receiving Office and claiming priority to Korean Patent Application No. 10-2021-0103451, filed on Aug. 5, 2021, in the Korean Intellectual Property Office, the disclosures of which are incorporated by reference herein in their entireties.

BACKGROUND

Field

The disclosure relates to a wireless communication system, and, for example, to an apparatus and method for fronthaul transmission in the wireless communication system.

DESCRIPTION OF RELATED ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the increase in transmission capacity in the wireless communication system, a function split for functionally splitting a base station is applied. According to the function split, the base station may be split into a Digital Unit (DU) and a Radio Unit (RU). A front haul for communication between the DU and the RU is defined, and transmission through the front haul is required.

SUMMARY

Embodiments of the disclosure provide a method of transmitting Uplink (UL) data in a wireless communication system by fragmenting the UL data into a plurality of packets, thereby reducing a time delay of UL combining.

Embodiments of the disclosure provide a method of transmitting UL data in a wireless communication system by fragmenting UL data into a plurality of packets, thereby increasing a time margin with respect to a fronthaul structure in which a multi-level connection is achieved.

According to various example embodiments of the disclosure, a method performed by a Distributed Unit (DU) may include: generating configuration information for packets used in uplink data transmission of a plurality of Radio Units (RUs) providing a shared cell, and transmitting the configuration information for packets to an RU among the plurality of RUs through a fronthaul interface. The configuration information for packets may include information for indicating the number of per-packet Physical Resource Blocks (PRBs) for the uplink packets.

According to various example embodiments of the disclosure, a method performed by a radio unit (RU) may include: receiving configuration information for packets used in uplink data transmission of the RU, from a distributed unit (DU) through a fronthaul interface, and transmitting uplink data, based on the received configuration information for packets. The configuration information for packets may include information for indicating the number of per-packet physical resource blocks (PRBs) for the uplink packets. The RU may be included in a plurality of RUs providing a shared cell.

According to various example embodiments of the disclosure, a distributed unit (DU) may include: a transceiver, and at least one processor operatively coupled to the transceiver. The at least one processor may be configured to: generate configuration information for packets used in uplink data transmission of a plurality of radio units (RUs) providing a shared cell, and control the DU to transmit the configuration information for packets to an RU among the plurality of RUs through a fronthaul interface. The configuration information for packets may include information for indicating the number of per-packet physical resource blocks (PRBs) for the uplink packets.

In a method and apparatus according to various example embodiments of the disclosure, a wireless communication system transmits uplink data by fragmenting the data into a plurality of packets, thereby reducing a time delay caused by uplink combining.

In a method and apparatus according to various example embodiments of the disclosure, a wireless communication system transmits uplink by determining a transmission order of a plurality of packets, thereby reducing a time delay caused by uplink combining.

In a method and apparatus according to various example embodiments of the disclosure, a wireless communication system transmits uplink data by fragmenting the data into a plurality of packets, thereby increasing a time margin for a fronthaul structure in which a multi-level connection is achieved.

Advantages provided in the disclosure are not limited to the aforementioned advantages, and other advantages not mentioned herein may be clearly understood by those skilled in the art to which the disclosure pertains from the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

The same or similar reference numerals in the drawings may be used for the same or similar components.

DETAILED DESCRIPTION

Figure 1A:
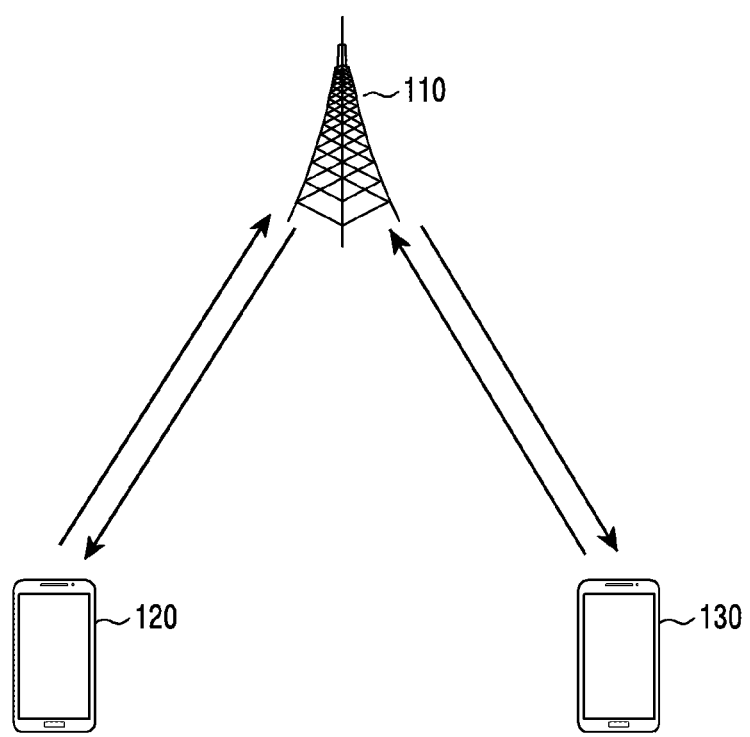
FIG. 1A is a diagram illustrating an example wireless communication system according to various embodiments.

Terms used in the disclosure are for the purpose of describing various example embodiments and are not intended to limit various embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. The terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

In the following description, terms referring to a signal (e.g., a message, information, a preamble, a signal, signaling, a sequence, a stream), a resource (e.g., a symbol, a slot, a subframe, a radio frame, a subcarrier, a Resource Element (RE), a Resource Block (RB), a Physical Resource Block (PRB), a Bandwidth Part (BWP), an occasion), an operational state (e.g., a step, an operation, a procedure), data (e.g., a packet, a user stream, information, a bit, a symbol, a codeword), a channel, control information (e.g., Downlink Control Information (DCI), a Medium Access Control (MAC) Control Element (CE), Radio Resource Control (RRC) signaling), network entities, a component of a device, or the like are used for convenience of explanation. Therefore, the disclosure is not limited to the terms described below, and thus other terms having the same or similar technical meaning may also be used.

In addition, although an expression 'greater than' or 'less than' is used in the disclosure to determine whether a specific condition is satisfied (or fulfilled), this is for example purposes and does not exclude an expression of 'greater than or equal to' or 'less than or equal to'. A condition described as "greater than or equal to" may be replaced with "greater than". A condition described as "less than or equal to" may be replaced with "less than". A condition described as "greater than or equal to and less than" may be replaced with "greater than and less than or equal to".

In addition, although the disclosure describes various embodiments using terms used in some communication standards (e.g., 3$^{rd}$ Generation Partnership Project (3GPP), extensible Radio Access Network (xRAN), Open-Radio Access Network (O-RAN)), this is for example purposes only. Various embodiments of the disclosure may be easily modified and applied to other communication systems.

FIG. 1A is a diagram illustrating an example wireless communication system according to various embodiments. As part of nodes which use a radio channel, a base station 110, a terminal 120, and a terminal 130 are illustrated by way of non-limiting example in the wireless communication system of FIG. 1. Although only one base station is illustrated in FIG. 1, other base stations identical or similar to the base station 110 may be further included.

The base station 110 is a network infrastructure which provides a radio access to the terminals 120 and 130. The base station 110 has a coverage defined as a specific geographic region, based on a distance capable of transmitting a signal. In addition to the term 'base station', the base station 110 may be referred to as an 'Access Point (AP)', an 'eNodeB (eNB)', a '5th Generation (5G) node', a 'next generation NodeB (gNB)', a 'wireless point', a 'Transmission/Reception Point (TRP)', or other terms having equivalent technical meanings.

As a described used by a user, each of the terminal 120 and the terminal 130 communicates with the base station 110 through the radio channel. A link from the base station 110 to the terminal 120 or the terminal 130 is referred to as a downlink (DL), and a link from the terminal 120 or the terminal 130 to the base station 110 is referred to as an uplink (UL). In addition, the terminal 120 and the terminal 130 may communicate with each other through the radio channel. In this case, a link between the terminal 120 and the terminal 130, e.g., a Device-to-Device (D2D) link, is referred to as a sidelink, and may be used interchangeably with a PC5 interface. Optionally, at least one of the terminals 120 to 130 may be operated without user involvement. That is, as a device for performing Machine Type Communication (MTC), at least one of the terminals 120 to 130 may not be carried by the user. In addition to the term 'terminal', each of the terminals 120 and 130 may be referred to as a 'User Equipment (UE)', a 'Customer Premises Equipment (CPE)', a 'mobile station', a 'subscriber station', a 'remote terminal', a 'wireless terminal', an 'electronic device', a 'user device', or other terms having equivalent technical meanings.

The base station 110, the terminal 120, and the terminal 130 may perform beamforming. The base station and the terminal may transmit and receive a radio signal at a relatively low frequency band (e.g., a Frequency Range 1 (FR1) of NR). In addition, the base station and the terminal may transmit and receive a radio signal at a relatively high frequency band (e.g., FR2 of NR, a millimeter Wave (mmWave) band (e.g., 28 GHz, 30 GHz, 38 GHz, 60 GHz)). In various embodiments, the base station 110 may communicate with the terminal 110 within a frequency range corresponding to the FR1. In various embodiments, the base station may communicate with the terminal 120 within a frequency range corresponding to the FR2. In this case, to improve a channel gain, the base station 110, the terminal 120, and the terminal 130 may perform beamforming. Herein, the beamforming may include transmission beamforming and reception beamforming. That is, the base station 110, the terminal 120, and the terminal 130 may assign a directivity to a transmission signal and or a reception signal. For this, the base station 110 and the terminals 120 and 130 may select serving beams through a beam search or beam management procedure. After the serving beams are selected, subsequent communication may be performed through a resource having a Quasi Co-Located (QCL) relation with a resource used to transmit the serving beams.

If large-scale characteristics of a channel which has delivered a symbol on a first antenna port may be inferred from a channel which has delivered a symbol on a second antenna port, it may be evaluated that the first antenna port and the second antenna port have the QCL relation. For example, the large-scale characteristics may include at least one of a delay spread, a Doppler spread, a Doppler shift, an average gain, an average delay, and a spatial receiver parameter.

Although it is discussed with respect to FIG. 1A that both the base station and the terminal perform the beamforming, various embodiments of the disclosure are not necessarily limited thereto. In various embodiments, the terminal may perform, or may not perform, the beamforming. In addition, the base station may perform, or may not perform, the beamforming. That is, any one of the base station and the terminal may perform the beamforming, or both the base station and the terminal may not perform the beamforming.

In the disclosure, a beam may refer, for example, to a spatial flow of a signal in a radio channel, and is formed by one or more antennas (or antenna elements). Such a forming process may be referred to as beamforming. The beamforming may include analog beamforming and digital beamforming (e.g., precoding). Examples of a reference signal transmitted based on the beamforming may include a Demodulation-Reference Signal (DM-RS), a Channel State Information-Reference Signal (CSI-RS), a Synchronization Signal/Physical Broadcast Channel (SS/PBCH), and a Sounding Reference Signal (SRS). In addition, as a configuration for each reference signal, an IE such as a CSI-RS resource or an SRS-resource or the like may be used, and this configuration may include information associated with the beam. The information associated with the beam may refer, for example, to whether a corresponding configuration (e.g., CSI-RS resource) uses the same spatial domain filter of another configuration (e.g., another CSI-RS resource in the same CSI-RS resource set) or uses another spatial domain filter, or to which reference signal it is subjected to Quasi-Co-Located (QCL), and if it is subjected to the QCL, which type (e.g., QCL type A, B, C, D) it is.

In a communication system having a relatively large cell radius of a base station, each base station is installed to include functions of a digital processing unit (or a Digital Unit (DU)) and a Radio Frequency (RF) processing unit (or a Radio Unit (RU)). However, since a higher frequency band is used and a cell radius of a base station is decreased in a $4^{th}$ Generation (4G) and/or next-generation communication system, the number of base stations for covering a specific region is increased, and an installation cost burden of an operator is increased to install the increased number of base stations. In order to minimize and/or reduce the installation cost of the base station, a structure is disclosed in which the DU and the RU of the base station are separated such that one or more RUs are coupled to one DU through a wired network, and one or more RUs geographically distributed to cover the specific region are disposed. Hereinafter, a structure of disposing the base station and extended examples thereof will be described according to various embodiments of the disclosure with reference to FIG. 1B.

Figure 1B:
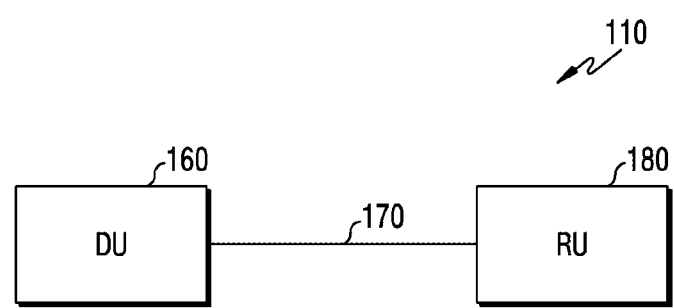
FIG. 1B is a block diagram illustrating an example configuration of a fronthaul structure based on a functional split of a base station according to various embodiments.

FIG. 1B is a block diagram illustrating an example configuration of a fronthaul structure based on a functional split of a base station according to various embodiments. A fronthaul may refer, for example, to a connection from one entity to another, between a WLAN and the base station, unlike a backhaul between the base station and a core network. Although an example of a fronthaul structure between the DU 160 and one RU 180 is illustrated in FIG. 1B, this is only for convenience of explanation, and the disclosure is not limited thereto. In other words, the embodiments of the disclosure may also be applied to a fronthaul structure between one O-DU and a plurality of O-RUs as shown, for example, in FIG. 5. For example, the embodiments of the disclosure may be applied to a fronthaul structure between one O-DU and two O-RUs. In addition, the embodiment of the disclosure may be applied to a fronthaul structure between one O-DU and three O-RUs.

Referring to FIG. 1B, the base station 110 may include the DU (e.g., including various circuitry) 160 and the RU (e.g., including various circuitry) 180. A fronthaul 170 between the DU 160 and the RU 180 may be operated through an $F_x$ interface. For the operation of the fronthaul 170, for example, an interface such as enhanced Common Public Radio Interface (eCPRI) or Radio Over Ethernet (ROE) may be used.

With the development of communication technology, mobile data traffic increases, which results in a significant increase in a bandwidth required in a fronthaul between a DU and an RU. In a deployment such as a Centralized/Cloud Radio Access Network (C-RAN), the DU may be realized to perform functions for Packet Data Convergence Protocol (PDCP), Radio Link Control (RLC), Media Access Control (MAC), and Physical (PHY), and the RU may be realized to further perform functions for the PHY layer in addition to a Radio Frequency (RF) function.

The DU 160 may be in charge of an upper layer function of a wireless network. For example, the DU 160 may perform a function of the MAC layer and a part of the PHY layer. Herein, the part of the PHY layer is performed at a higher level among functions of the PHY layer, and may include, for example, channel encoding (or channel decoding), scrambling (or descrambling), modulation (or demodulation), layer mapping (or layer demapping). According to an embodiment, when the DU 160 conforms to the O-RAN standard, it may be referred to as an O-RAN DU (O-DU). Optionally, the DU 160 may be represented by being replaced with a first network entity for a base station (e.g., gNB) in embodiments of the disclosure.

The RU 180 may be in charge of a lower layer function of the wireless network. For example, the RU 180 may perform a part of the PHY layer and an RF function. Herein, the part of the PHY layer is performed at a relatively lower level than the DU 160 among the functions of the PHY layer, and may include, for example, IFFT conversion (or FFT conversion), CP insertion (CP removal), and digital beamforming. An example of such a function split is described in detail with reference to FIG. 4. The RU 180 may be referred to as an 'Access Unit (AU)', an 'Access Point (AP)', a 'Transmission/Reception Point (TRP)', a Remote Radio Head (RRH), a 'Radio Unit (RU)', or other terms having equivalent technical meanings. Optionally, the DU 180 may be represented by being replaced with a second network entity for a base station (e.g., gNB) in embodiments of the disclosure.

Although it is described in FIG. 1B that the base station includes the DU and the RU, various embodiments of the disclosure are not limited thereto. In various embodiments, the base station may be realized with a distributed deployment according to a Centralized Unit (CU) including various circuitry configured to perform a function of upper layers (e.g., Packet Data Convergence Protocol (PDCP), RRC) of an access network and a Distributed Unit (DU) configured to perform a function of a lower layer. In this case, the DU may include the Digital Unit (DU) and Radio Unit (RU) of FIG. 1. Between a core (e.g., 5G Core (5GC) or Next Generation Core (NGC)) network and a wireless network (RAN), the base station may be realized in a structure in which a CU, a DU, and an RU are deployed in that order. An interface between the CU and the Distributed Unit (DU) may be referred to as an F1 interface.

The Centralized Unit (CU) may be coupled to one or more DUs to be in charge of a function of an upper layer than the DU. For example, the CU may be in charge of a function of a Radio Resource Control (RRC) and Packet Data Convergence Protocol (PDCP) layer, and the DU and the RU may be in charge of a function of a lower layer. The DU may perform some functions (high PHY) of Radio Link Control (RLC), Media Access Control (MAC), Physical (PHY) layers. In addition, for example, the Digital Unit (DU) may be included in a Distributed Unit (DU) according to a distributed deployment realization of the base station. Hereinafter, in the disclosure, the Digital Unit (DU) may be understood to have the same or similar meaning as a Distributed Unit (DU) not including the RU for convenience of explanation. In addition, the Digital Unit (DU) (or the Distributed Unit (DU)) may be understood to have the same or similar meaning as an O-RAN Digital Unit (O-DU) or an O-RAN Distributed Unit (O-DU).

Figure 2:
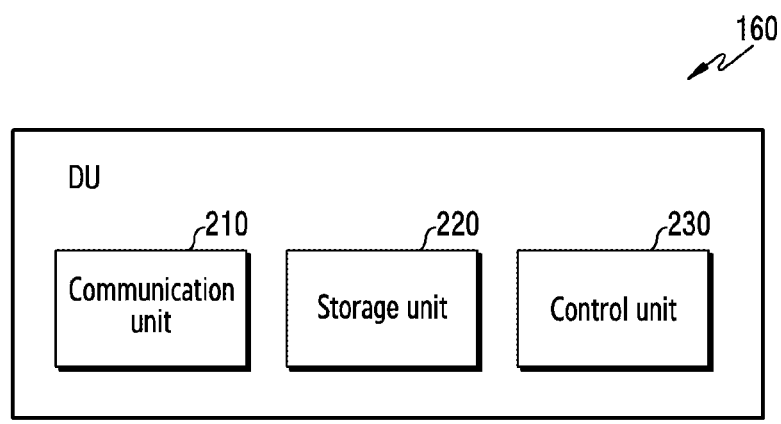
FIG. 2 is a block diagram illustrating an example configuration of a Distributed Unit (DU) according to various embodiments.

FIG. 2 is a block diagram illustrating an example configuration of a Distributed Unit (DU) in a wireless communication system according to various embodiments. The example structure of FIG. 2 may be understood as a structure of the DU 160 of FIG. 1B. Hereinafter, the term ' . . . unit', ' . . . device', or the like implies a unit of processing at least one function or operation, and may be implemented in hardware or software or in combination of the hardware and the software.

Referring to FIG. 2, the DU 160 includes a communication unit (e.g., including communication circuitry) 210, a storage unit (e.g., a memory) 220, and a control unit (e.g., including control/processing circuitry) 230.

The communication unit 210 may include various communication circuitry and perform functions for transmitting/receiving a signal in a wired communication environment. The communication unit 210 may include a wired interface for controlling a direct connection between one device and another device via a transmission medium (e.g., a copper wire, an optical fiber). For example, the communication unit 210 may transfer an electrical signal to another device via the copper line, or may perform a conversion between the electrical signal and an optical signal. The communication unit 210 may be coupled to a Radio Unit (RU). The communication unit 210 may be coupled to a core network or may be coupled to a CU deployed in a distributed manner.

The communication unit 210 may perform functions for transmitting/receiving a signal in a wireless communication environment. For example, the communication unit 210 may perform a function of conversion between a baseband signal and a bit-stream according to a physical layer standard of a system. For example, in data transmission, the communication unit 210 may generate complex symbols by coding and modulating a transmitted bit-stream. In addition, in data reception, the communication unit 210 restores a received bit-stream through demodulation and decoding of a baseband signal. In addition, the communication unit 210 may include a plurality of transmission/reception paths. In addition, according to an embodiment, the communication unit 210 may be coupled to a core network or may be coupled to other nodes (e.g., Integrated Access Backhaul (IAB)).

The communication unit 210 may transmit and receive a signal. For this, the communication unit 210 may include at least one transceiver. For example, the communication unit 210 may transmit a synchronization signal, a reference signal, system information, a message, a control message, a stream, control information, data, or the like. In addition, the communication unit 210 may perform beamforming.

The communication unit 210 transmits and receives a signal as described above. Accordingly, the communication unit 210 may be referred to as a 'transmitter', a 'receiver', or a 'transceiver'. In addition, in the following description, transmission and reception performed through a radio channel are used to imply that the aforementioned process is performed by the communication unit 210.

Although not shown in FIG. 2, the communication unit 210 may further include a backhaul communication unit to be coupled to the core network or a different base station. The backhaul communication unit provides an interface for performing communication with different nodes in a network. For example, the backhaul communication unit coverts a bit-stream transmitted from the base station to a different node, for example, a different access node, a different base station, a higher node, a core network, or the like, into a physical signal, and converts the physical signal received from the different node into a bit-stream.

The storage unit 220 may also be referred to as a memory and stores data such as a basic program, application program, configuration information, or the like for an operation of the DU 160. The storage unit 220 may include a memory. The storage unit 220 may be constructed of a volatile memory, a non-volatile memory, or a combination of the volatile memory and the non-volatile memory. In addition, the storage unit 220 provides stored data according to a request of the control unit 230.

The control unit 230 may include various control/processing circuitry and controls overall operations of the DU 160. For example, the control unit 230 transmits and receives a signal via the communication unit 210 (or through the backhaul communication unit). Further, the control unit 230 writes data to the storage unit 220, and reads the data. In addition, the communication unit 230 may perform functions of a protocol stack required in a communication standard. For this, the control unit 230 may include at least one processor.

The structure of the DU 160 of FIG. 2 is only an example, and the example of the DU performing various embodiments of the disclosure is not limited to the structure illustrated in FIG. 2. The structure may be added, deleted, or changed in part according to various embodiments.

Figure 3:
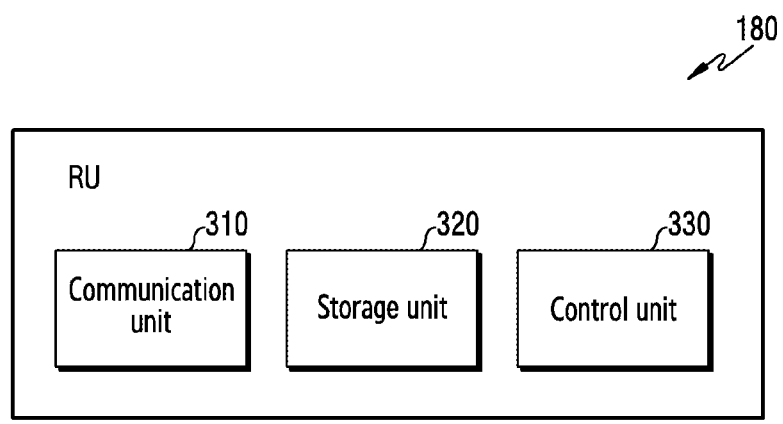
FIG. 3 is a block diagram illustrating an example configuration of a Radio Unit (RU) according to various embodiments.

FIG. 3 is a block diagram illustrating an example configuration of a Radio Unit (RU) in a wireless communication system according to various embodiments. The example structure of FIG. 3 may be understood as a structure of the RU 180 of FIG. 1B. Hereinafter, the term ' . . . unit', ' . . . device', or the like implies a unit of processing at least one function or operation, and may be implemented in hardware or software or in combination of the hardware and the software.

Referring to FIG. 3, the RU 180 includes a communication unit (e.g., including communication circuitry) 310, a storage unit (e.g., a memory) 320, and a control unit (e.g., including control/processing circuitry) 330.

The communication unit 310 may include various communication circuitry and performs functions for transmitting and receiving a signal through a radio channel. For example, the communication unit 310 up-converts a baseband signal into an RF signal and thereafter transmits it through an antenna, and down-converts an RF signal received through the antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission/reception paths. Further, the communication unit 310 may include an antenna unit. The communication unit 310 may include at least one antenna array constructed of a plurality of antenna elements. From a hardware aspect, the communication unit 310 may be constructed of a digital circuit and an analog circuit (e.g., a Radio Frequency Integrated Circuit (RFIC)). Herein, the digital circuit and the analog circuit may be realized as one package. In addition, the communication unit 310 may include a plurality of RF chains. The communication unit 310 may perform beamforming. In order to assign a directivity depending on a configuration of the control unit 330 to a signal to be transmitted/received, the communication unit 310 may apply a beamforming weight to the signal. According to an embodiment, the communication unit 310 may include a Radio Frequency (RF) block (or an RF unit).

In addition, the communication unit 310 may transmit and receive a signal. For this, the communication unit 310 may include at least one transceiver. The communication unit 310 may transmit a downlink signal. The downlink signal may include a Synchronization Signal (SS), a Reference Signal (RS) (e.g., Cell-specific Reference Signal (CRS), Demodulation (DM)-RS), system information (e.g., MIB, SIB, Remaining System Information (RMSI), Other System Information (OSI)), configuration message, control information, uplink data, or the like. In addition, the communication unit 310 may receive an uplink signal. The uplink signal may include a random access-related signal (e.g., Random Access Preamble (RAP) (or Message 1 (Msag 1), Message 3 (Msg3)), a reference signal (e.g., Sounding Reference Signal (SRS), DM-RS), a Power Headroom Report (PHR), or the like.

The communication unit 310 transmits and receives a signal as described above. Accordingly, the communication unit 310 may be referred to as a 'transmitter', a 'receiver', or a 'transceiver'. In addition, in the following description, transmission and reception performed through a radio channel are used to imply that the aforementioned process is performed by the communication unit 310.

The storage unit 320 may also be referred to as a memory and stores data such as a basic program, application program, configuration information, or the like for an operation of the RU 180. The storage unit 320 may be constructed of a volatile memory, a non-volatile memory, or a combination of the volatile memory and the non-volatile memory. In addition, the storage unit 320 provides stored data according to a request of the control unit 330. According to an embodiment, the storage unit 320 may include a memory for a condition, command, or setting value related to an SRS transmission method.

The control unit 330 may include various control/processing circuitry and controls overall operations of the RU 180. For example, the control unit 330 transmits and receives a signal via the communication unit 310. Further, the control unit 330 writes data to the storage unit 320, and reads the data. In addition, the communication unit 330 may perform functions of a protocol stack required in a communication standard. For this, the control unit 330 may include at least one processor. In various embodiments, the control unit 330 may be configured to transmit an SRS to the DU 160, based on an antenna number. In addition, in various embodiments, the control unit 330 may be configured to transmit the SRS to the DU 160 after uplink transmission. A condition command or setting value based on the SRS transmission method is a command set or code stored in the storage unit 320, and may be a command/code resided in the control unit 330 at least temporarily or a storage space storing the command/code, or may be part of a circuity of the control unit 330. In addition, the control unit 330 may include various modules for performing communication. According to various embodiments, the control unit 330 may control the RU 180 to perform operations based on various embodiments described below.

Figure 4:
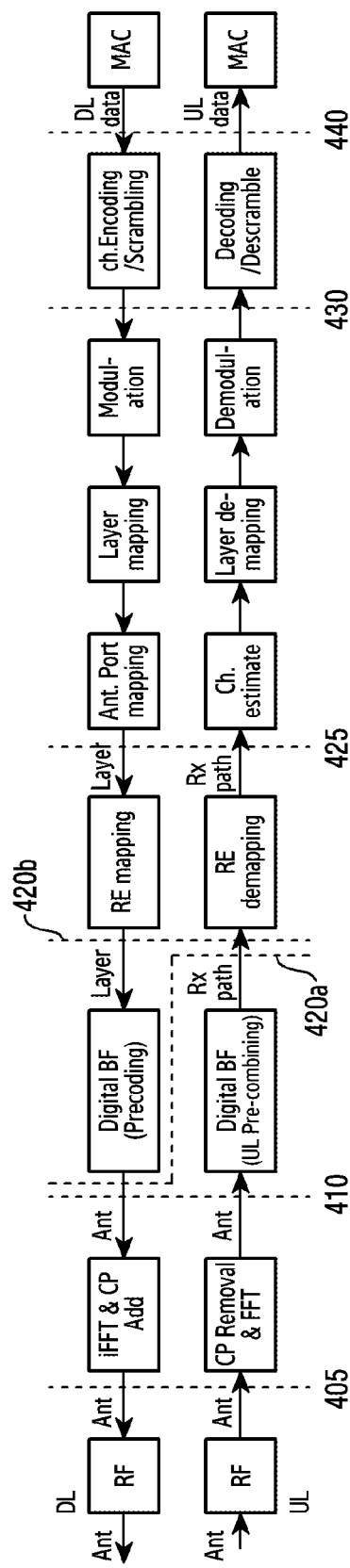
FIG. 4 is a diagram illustrating an example of a function split according to various embodiments.

FIG. 4 is a diagram illustrating an example of a function split in a wireless communication system according to various embodiments. With the development of wireless communication technology (e.g., with the instruction of a 5th Generation (5G) communication system (or New Radio (NR) communication system)), a frequency band to be used further increases, and a cell radius of a base station becomes very small, which results in a further increase in the number of RUs required to be installed. In addition, in the 5G communication system, an amount of data to be transmitted increases up to more than 10 times, which results in a significant increase in transmission capacity of a wired network in which fronthaul transmission is achieved. Due to these factors, installation cost of the wired network may significantly increase in the 5G communication system. Therefore, in order to decrease the transmission capacity of the wired network and to reduce the installation cost of the wired network, technologies for reducing the transmission capacity of the fronthaul by allowing the RU to be in charge of some functions of the modem of the DU have been disclosed, and these technologies may be referred to a 'function split'.

In order to reduce the burden of the DU, a method in which the role of the RU responsible for only the RF function is extended to some functions of the physical layer is considered. In this case, the higher the layer of which functions are performed by the RU, the greater the throughput of the RU, which results in an increase in a transmission bandwidth in the fronthaul. At the same time, a requirement constraint for a delay time caused by response processing may be decreased. Meanwhile, the higher the layer of which functions are performed by the RU, the lower the virtualization gain and the higher the size/weight/cost of the RU. It is required to realize an optimal function split by considering a trade-off of the aforementioned advantages and disadvantages.

Referring to FIG. 4, function splits in a physical layer below an MAC layer is illustrated. In a Downlink (DL) case in which a signal is transmitted to a terminal through a wired network, a base station may sequentially perform channel encoding/scrambling, modulation, layer mapping, antenna mapping, RE mapping, digital beamforming (e.g., precoding), IFFT conversion/CP insertion, and RF conversion. In case of an Uplink (UL) in which a signal is received from the terminal through the wired network, the base station may sequentially perform RF conversion, FFT conversion/CP removal, digital beamforming (pre-combining), RE demapping, channel estimation, layer demapping, demodulation, and decoding/descrambling. The split for uplink functions and downlink functions may be defined in various types depending on necessity between vendors, discussion on standards, or the like according to the aforementioned trade-off.

A first function split 405 may be a split of the RF function and the PHY function. The first function split is when the PHY function in the RU is not realized in practice, and for example, may be referred to as Option 8. A second function split 410 allows the RU to perform IFFT transform/CP insertion in DL of the PHY function and FFT transform/CP removal in UL, and allows the DU to perform the remaining PHY functions. For example, the second function split 410 may be referred to as Option 7-1. A third function split 420*a* may allow the RU to perform IFFT conversion/CP insertion in DL and FFT conversion/CP removal in UL and beamforming, and allows the DU to perform the remaining PHY functions. For example, the third function split 420*a* may be referred to as Option 7-2x Category A. A fourth function split 420*b* allows the RU to perform up to digital beamforming in both DL and UL, and allows the DU to perform higher PHY functions after digital beamforming. For example, the fourth function split 420*b* may be referred to as Option 7-2x Category B. A fifth function split 425 allows the RU to perform up to RE mapping (or RE demapping) in both DL and UL, and allow the DU to perform higher PHY functions after RE mapping (or RE demapping). For example, the fifth function split 425 may be referred to as Option 7-2. A sixth function split 430 allows the RU to perform up to modulation (or demodulation) in both DL and UL, and allows the DU to perform higher PHY functions after modulation (or demodulation). For example, the sixth function split 430 may be referred to as Option 7-3. A seventh function split 440 allows the RU to perform up to encoding/scrambling (or decoding/descrambling) in both DL and UL, and allows the DU to perform higher PHY functions after modulation (or demodulation). For example, the seventh function split may be referred to as Option 6.

According to an embodiment, when large-capacity signal processing is expected as in FR1 MMU, a function split at a relatively upper layer (e.g., the fourth function split 420*b*) may be required to reduce fronthaul capacity. In addition, a function split at an extremely high layer (e.g., the sixth function split 430) may have a complicated control interface and may cause a burden on the realization of the RU because a plurality of PHY processing blocks are included in the RU. Therefore, an appropriate function split may be required according to a method of deploying and realizing the DU and the RU.

According to an embodiment, when it is not possible to process precoding of data received from the DU (that is, when there is a limitation in precoding capability of the RU), the third function split 420*a* or a function split lower than that (e.g., the second function split 410) may be applied. On the contrary, when there is an ability to process the precoding of the data received from the DU, the fourth function split 420*b* or a function split higher than that (e.g., the sixth function split 430) may be applied. Hereinafter, various embodiments of the disclosure are described based on the third function split 420*a* (category A) or fourth function split 420*b* (category B) for performing a beamforming process in one RU unless otherwise limited, it may not refer to a configuration of an embodiment through other function split is excluded. A functional configuration, signaling, or operation of FIG. 8 to FIG. 12 described below may be applied not only to the third function split 420*a* or the fourth function split 420*b* but also other function splits.

According to various embodiments of the disclosure, standards of eCPRI and O-RAN are described for example as a fronthaul interface, when a message is transmitted between a DU (e.g., the DU 160 of FIG. 1B) and an RU (e.g., the RU 180 of FIG. 1B). An eCPRI header and an O-RAN header, and an additional field may be included in an Ethernet payload of a message. Although various embodiments of the disclosure are described hereinafter using terms of the standard of eCPRI or O-RAN, other expressions having the same meaning as the respective terms may be used instead of various embodiments of the disclosure.

A transport protocol of the fronthaul may use Ethernet and eCPRI which are easily shared with a network. An eCPRI header and an O-RAN header may be included in an Ethernet payload. The eCPRI header may be located in front of the Ethernet payload. The content of the eCPRI header may be as follows.

ecpriVersion (4 bits): 0001b (fixed value)
    ecpriReserved (3 bits): 0000b (fixed value)
    ecpriConcatenation (1 bit): 0b (fixed value)
    ecpriMessage (1 byte): Message type
    ecpriPayload (2 bytes): Payload size in bytes
    ecpriRtcid/ecpriPcid (2 bytes): x, y, and z may be configured through a Management plane (M-plane). This field may indicate a transmission path (an extended Antenna-carrier (eAxC) in eCPRI) of a control message according to various embodiments in multi-layer transmission.
        CU_Port_ID (x bits): Identify a channel card. Identification is possible including up to a modem (2 bits for channel card, 2 bits for Modem)

BandSector_ID (y bits): Identification based on cell/sector

CC_ID (z bits): Identification based on component carrier

RU_Port_ID (w bits): Identification based on layer, T, antenna, etc.

ecpriSeqid (2 bytes): Sequence ID is managed for each ecpriRtcid/ecpriPcid, and Sequence ID and subsequence ID are managed separately. Radio-transport-level fragmentation is possible when using Subsequence ID (different from Application-level fragmentation).

An application protocol of the fronthaul may include a Control plane (C-plane), a User plane (U-plane), a Synchronization plane (S-plane), and a Management plane (M-plane).

The C-plane may be configured to provide scheduling information and beamforming information through the control message. The U-plane may include user's downlink data (IQ data or SSB/RS), uplink data (IQ data or SRS/RS), or PRACH data. A weight vector of the aforementioned beamforming information may be multiplied by the user's data. The S-plane may be related to timing and synchronization. The M-plane may be related to an initial setup, non-realtime reset or a reset, and a non-realtime report.

Figure 5:
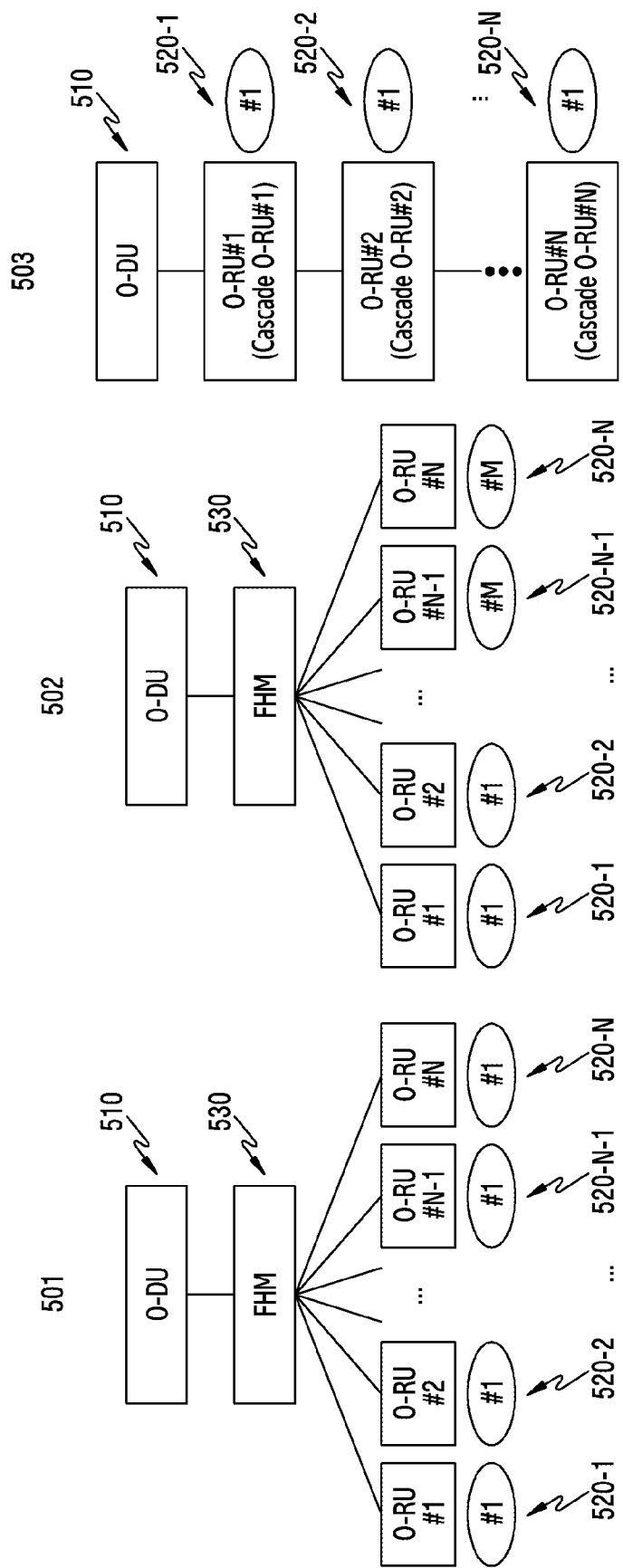
FIG. 5 is a diagram illustrating examples of a connection relationship between a DU and RUs according to various embodiments.

A section type is defined to define a type of a message transmitted in the C-plane. The section type may indicate a usage of the control message transmitted in the C-plane. For example, a usage for each section type is as follows.

sectionType=0: DL idle/guard periods–Tx blanking usage for power saving sectionType=1: Mapping of BF index or weight to RD of DL/UL channel (in O-RAN mandatory BF manner)

sectionType=2: Reserved sectionType=3: Mapping of beamforming index or weight to RE of PRACH and mixed-numerology channel sectionType=4: Reserved sectionType=5: Transfer of UE scheduling information (in O-RAN optional BF manner) so that RU is capable of calculating BF weight on real-time basis sectionType=6: Transfer of UE channel information (in O-RAN optional BF manner) periodically so that RU is capable of calculating BF weight on real-time basis sectionType=7: Used to support LAA FIG. 5 is a diagram illustrating examples of a connection relationship between a DU and RUs according to various embodiments. Referring to FIG. 5, the DU may be coupled to one or more RUs. The DU may be coupled to the plurality of RUs. The DU and the RU may be respectively referred to as an O-DU and an O-RU, when conforming to the O-RAN standard. Although the O-DU and O-RU of the O-RAN standard are illustrated as an example in FIG. 5 for convenience of explanation, it is understood that the following description may also be equally applied to a DU and RU of 3GPP. FIG. 5 may refer to examples of a structure of a fronthaul defined according to a structure in which the O-RUs are coupled to the O-DU.

Before the description of FIG. 5, a "shared cell" may be illustrated. The shared cell may refer, for example, to a plurality of O-RUs commonly providing the same cell. The same cell provided by the plurality of O-RUs may include one component carrier (e.g., one cell) or multiple component carriers (e.g., multiple cells). For example, when the plurality of O-RUs support the same cell (e.g., cell #1) of one component carrier, all of the plurality of O-RUs may operate to support the cell #1. As another example, when the plurality of O-RUs support multiple cells (e.g., cell #1, cell #2, ..., cell #N) of the multiple component carriers, some of the plurality of O-RUs may operate to support the cell #1, and the other O-RUs may operate to support the cell #N.

According to embodiments of the disclosure, a structure of a fronthaul interface between DU-RUs for providing the shared cell may be realized using at least one of two methods. For example, the structure of the fronthaul structure may be realized in a Fronthaul-Multiplexing (FHM) mode. The FHM mode may refer, for example, to a structure in which a plurality of O-RUs are multiplexed to one O-DU, that is, a structure in which each RU is directly coupled to a corresponding O-DU. As another example, the structure of the fronthaul interface may be realized in a cascade mode. The structure of the cascade mode may refer, for example, to a structure in which one O-RU among a plurality of O-RUs constructed for an O-DU is coupled for the I-DU, and the other O-RUs are coupled in series to the O-RU. Hereinafter, an example in which connection relationships between the O-DU and the plurality of O-RUs are configured with a shared cell will be described.

Referring to FIG. 5, FIG. 5 illustrates a first connection relationship 501, second connection relationship 502, and third connection relationship 503 as examples for a connection relationship between an O-DU and a plurality of O-RUs. Herein, the first connection relationship 501 may be referred to as an FHM mode of the same-cell scenario. The second connection relationship 502 may be referred to as an FHM mode of a multi-cell scenario. The third connection relationship 503 may be referred to as a cascade mode.

Referring to FIG. 5, the first connection relationship 501, the second connection relationship 502, and the third connection relationship 503 may include one O-DU 510 and a plurality of O-RUs 520-1, 520-2, ..., 520-N–1, 520-N. For convenience of explanation, it is assumed in FIG. 5 that the total number of O-RUs coupled to an FHM in the FHM mode or the total number of O-RUs in a cascaded chain in the cascade mode is N. In addition, it is assumed that the total number of other cells realized by N O-RUs coupled to the FHM in the FHM mode or the total number of other cells realized by O-RUs in the cascaded chain in the cascade mode is M. For example, M may be 1 in the first connection relationship 501. In addition, M may be 1 in the third connection relationship 503. The total number of O-RUs for realizing a specific cell (e.g., cell #m) may be denoted by $N_m$. For example, $N_m$ may be 1 in the first connection relationship 501. In addition, $N_m$ may be 1 in the third connection relationship 503.

Referring to the first connection relationship 501 and the second connection relationship 502, one O-DU 510 may be coupled to the plurality of O-RUs 520-1, 520-2, ... 520-N–1, 520-N through the FHM 530. The FHM 530 may be disposed between the O-DU 510 and the plurality of O-RUs 520-1, 520-2, ... 520-N–1, 520-N. The FHM 530 may be modeled as an O-RU. For example, the FHM 530 may support a Lower Layer Split (LLS) in the same manner as in a general O-RU. In addition, the FHM 530 may additionally perform a copy and combine function in the general O-RU. However, the FHM 530 may not include a radio transmission/reception function. In addition, the FHM 530 may support a selective transmission and reception function in order to perform the copy and combine function. In the first connection relationship 501, the plurality of O-RUs 520-1, 520-2, ... 520-N–1, 520-N may be used to operate the same cell. For example, the O-RU #1, O-RU #2 ... O-RU #N–1, O-RU #N of the first connection relationship 501 may be used to operate the cell #1. In the second connection relationship 502, the plurality of O-RUs

520-1, 520-2, . . . 520-N−1, 520-N may be used to operate multiple cells. For example, in the O-RU #1, O-RU #2 . . . O-RU #N−1, O-RU #N of the second connection relationship 502, the O-RU #1 and the O-RU #2 may be used to operate the cell #1, and the O-RU #N−1 and the O-RU #N may be used to operate the cell #M. Although it is illustrated for example that two O-RUs operate the same cell in the second connection relationship 502, the disclosure is not limited thereto, and different cells may operate different numbers of O-RUs. For example, the O-RU #1 may operate the cell #1, and the O-RU #2, the O-RU #N−1, and the O-RU #N may operate the cell #M.

Referring to the third connection relationship 503, one O-DU 510 may be realized by the plurality of O-RUs 520-1, 520-2, . . . 520-N−1, 520-N (e.g., O-RU #1, O-RU #2, . . . O-RU #N) cascaded in a chain. In other words, at least one O-RU may be coupled between one O-DU 510 and one O-RU (e.g., O-RU #N). For example, one O-RU may be disposed between one O-DU and one O-RU (e.g., O-RU #N). In addition, two O-RUs may be disposed between one O-DU and one O-RU (e.g., O-RU #N). In addition, three O-RUs may be disposed between one O-DU and one O-RU (e.g., O-RU #N). In this case, each of the plurality of O-RUs 520-1, 520-2, . . . 520-N−1, 520-N may be referred to as a cascade O-RU. The plurality of O-RUs 520-1, 520-2, . . . 520-N−1, 520-N of the third connection relationship 503 may support a copy and combine function. Herein, the O-RU #N furthest from the O-DU among the plurality of O-RUs may support the copy and combine function, but may not use the copy and combine function. In other words, the O-RU #N may be realized not only as a cascade O-RU but also as a normal O-RU. The plurality of O-RUs 520-1, 520-2, . . . 520-N−1, 520-N of the third connection relationship 503 may be used to operate the same cell. For example, the O-RU #1, O-RU #2, . . . O-RU #N may be used to provide the cell #1.

To describe a relative connection deployment of the O-DU and the O-RU, a north-node and a south-node may be illustrated. In a chain in which a plurality of O-RUs are cascaded (e.g., the third connection relationship 503), with respect to a reference O-RU, an O-RU located close to the O-DU may be referred to as the north-node, and an O-RU located far from the O-DU may be referred to as the south-node. For example, with respect to the O-RU #2, the O-RU #1 may be referred to as the north-node, and the O-RU #3 may be referred to as the south-node. If an O-RU adjacent to the O-DU is used as a reference, the O-DU may be referred to as the north-node. For example, with respect to the O-RU #1, the O-DU may be referred to as the north-node. However, these terms (the north-node and the south-node) may also be equally used in the FHM mode for commonality of M-plane modeling. For example, in the FHM mode (e.g., the first connection relationship 501 and the second connection relationship 502), with respect to the FHM, the O-DU may be referred to as the north-node, and the plurality of O-RUs may be referred to as the south-nodes.

Although the FHM mode (e.g., the first connection relationship 501 or the second connection relationship 502) and the cascade mode (e.g., the third connection relationship 503) are separately illustrated in FIG. 5, the description of FIG. 5 may also be equally applied to a mode in which the FHM mode and the cascade mode are combined (a cascade-FHM mode).

Figure 6A:
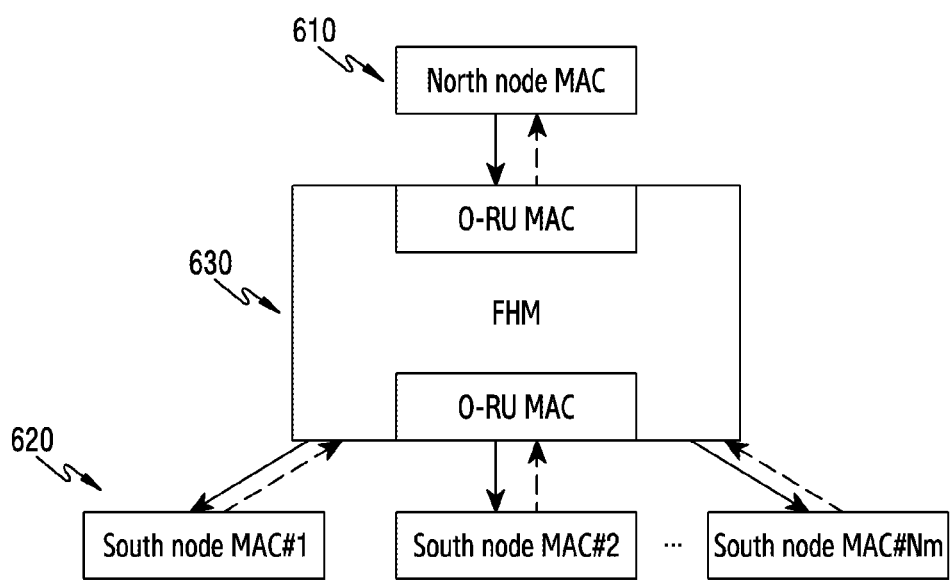
FIG. 6A is a diagram illustrating an example of a copy and combine function of an FHM mode according to various embodiments.

FIG. 6A is a diagram illustrating an example of a copy and combine function of an FHM mode according to various embodiments o. As described above with reference to FIG. 5, the FHM mode of FIG. 5A may be the FHM mode of the same-cell scenario or the FHM mode of the multi-cell scenario. A direction indicated by a solid line in FIG. 6A may refer, for example, to a Downlink (DL), and a direction indicated by a dotted line may refer, for example, to an Uplink (UL). In other words, the solid line may refer, for example, to a process of transmitting a message from a north-node (e.g., O-DU) to a plurality of south-nodes (e.g., a plurality of O-RUs), and the dotted line may refer, for example, to a process of transmitting a message from the plurality of south-nodes to the north-node. Although the north-node and the south-nodes are illustrated in FIG. 6A, the north-node and the south-nodes may be equally understood as the O-DU and the O-RUs, respectively.

Referring to FIG. 6A, a base station may include a north-node 610, a Fronthaul Multiplexer (FHM) 630, and N south-nodes 620. The FHM 630 may be disposed between the north-node 610 and the N south-nodes 620. The FHM 630 disposed between the north-node 610 and the N south-nodes 620 may support LLS, and may perform the copy and combine function. In this case, the FHM 630 may perform a selective transmission/reception function in order to perform the copy and combine function.

The solid line may refer to a DL path. The FHM 630 may retrieve a message (e.g., an eCPRI message, a C/U-plane message) received from the north-node 620. The FHM 630 may copy the retrieved messages (e.g., an eCPRI message including an eCPRI header and an eCPRI payload) to Ethernet frames as a payload without any modification. In addition, the FHM 630 may transmit the copied messages to each of the N south-nodes 620 which realize a shared cell. In case of the same-cell scenario, the FHM 630 may perform the copy operation for the south-node #1 to the south-node #$N_m$ 620. In case of the multi-cell scenario, for a specific cell #m, the FHM 630 may perform the copy operation for the south-node #1 to the south-node #$N_m$ associated with the specific cell #m. The copy operation performed by the FHM 630 may be referred to as a DL copy function.

Similarly to a DL case, the copy function may also be equally applied to a UL case. The copy operation for UL data, which is performed by the FHM 630, may be referred to as a UL copy function.

The dotted line may refer to a UL path. The FHM 630 may receive Ethernet frames from each of the south-nodes. The FHM 630 may combine IQ data corresponding the same radio resource element from a plurality of eCPRI messages for a UL U-plane of the Ethernet frames. In other words, the FHM 630 may receive Ethernet frames, identify a portion corresponding to a specific radio resource element in the eCPRI message of the received Ethernet frames, and combine the identified IQ data.

In order for the FHM 630 to combine the IQ data, the FHM 630 may identify IQ data corresponding to the same radio resource element from information elements. In this case, the information elements may refer to information of an eCPRI transport header, an application layer common header, and an application layer section field. When transport layer fragmentation occurs, the FHM 630 may first reassemble a fragmented message. If compression information exists in eCPRI, the FHM 630 may retrieve compression information, e.g., iSample and qSample, and calculate the combined iSample and qSample by individually adding each of iSample and qSample. For example, an algorithm for calculating the compression information by the FHM 630 is as shown in Table 1 below.

TABLE 1

If U-Plane data compression is used then
   Combined iSample = Compress (Sum (Decompress (iSample_#1), ... ,
   Decompress (iSample_#$N_m$) ) ),
   Combined qSample = Compress (Sum (Decompress (qSample_#1), ... ,
   Decompress (qSample_#$N_m$) ) ),
Else
   Combined iSample = Sum (iSample_#1, ... , iSample_#$N_m$),
   Combined qSample = Sum (qSample_#1, ... , qSample_#$N_m$),
where
   iSample_#n is the iSample received from the O-RU#n and
   qSample_#n is the qSample received from the O-RU#n.

If an overflow occurs in the combine process, iSample and/or qSample may be fixed to the closest value which may be expressed in a compression format used for the combined IQ data. The compression format of the combined IQ data may be the same as the compression format of the IQ data received from the O-RUs.

After the combination is performed, the FHM 630 may generate an eCPRI header. In this case, a field (e.g., ecpriSeqid field) generated by the FHM 630 is independent, and may be a copy received from the south-nodes 620. Other fields may also be copies of the field received from the south-nodes 620. In addition, the FHM 630 may add the combined IQ data as an eCPRI message body. The FHM 630 may configure Ethernet frames carrying the eCPRI message as a payload. The FHM 630 may forward the configured Ethernet frames to the north-node 610. In case of the same-cell scenario, the FHM 630 may perform combination for the O-RU #1 to the O-RU #$N_m$ 620. In case of the multi-cell scenario, for a specific cell, the FHM 630 may perform combination for the O-RU #1 to the O-RU #$N_m$ 620.

Figure 6B:
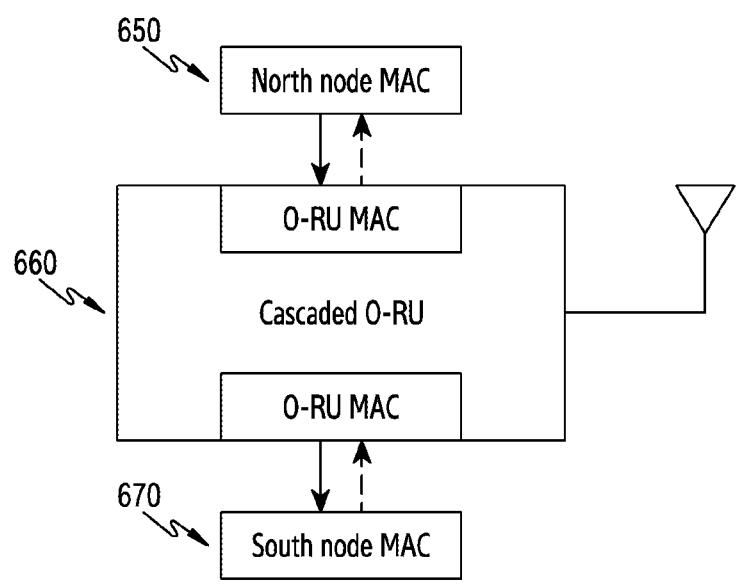
FIG. 6B is a diagram illustrating an example of a copy and combine function of a cascade mode according to various embodiments.

FIG. 6B is a diagram illustrating an example of a copy and combine function of a cascade mode according to various embodiments. The cascade mode of FIG. 6B may refer, for example, to a state in which a plurality of O-RUs are realized as a cascaded chain as described above with reference to FIG. 5. A direction indicated by a solid line in FIG. 6B may refer, for example, to a DL, and a direction indicated by a dotted line may refer, for example, to a UL. In other words, the solid line may refer to a process of transmitting a message from a north-node (e.g., O-DU) to a south-node (e.g., O-RU) located farthest from the north-node, and the dotted line may refer to a process of transmitting a message from the south-node to the north-node. Although the north-node and the south-node are illustrated in FIG. 6B, the north-node and the south-node may be equally understood as the O-DU and the O-RU, respectively.

Referring to FIG. 6B, a base station may include a north-node 650, at least one O-RU 660, and a south-node 670. At least one O-RU 660 may be realized as a cascaded chain. The at least one O-RU 660 and the south-node 670 may be referred to as a cascade O-RU. The south-node 670 may support s copy and combine function, but may not use the copy and combine function. In other words, it may be realized not only as a south-node cascade O-RU but also as a normal O-RU. For convenience of explanation, in FIG. 6B, a case where the at least one O-RU 660 is one cascaded O-RU will be described as an example. However, the disclosure is not limited thereto, and the following description may also be equally applied to a case of a plurality of cascaded O-RUs.

The solid line may refer, for example, to a DL path. The cascaded O-RU 660 may retrieve an eCPRI message (e.g., an eCPRI message, a C/U-plane message) received from the north-node 650. In addition, the cascaded O-RU 660 may copy the retrieved messages (e.g., an eCPRI message including an eCPRI header and an eCPRI payload) to Ethernet frames as a payload without any modification. In addition, the cascaded O-RU 660 may transmit the copied messages to the south-node 670. As described above, the cascaded O-RU 660 may perform a copy function for the DL. The copy operation performed by the cascaded O-RU 660 may be referred to as a DL copy function.

Similarly to a DL case, the copy function may also be equally applied to a UL case. The copy operation for UL data, which is performed by the cascaded O-RU 660, may be referred to as a UL copy function.

The dotted line may refer, for example, to a UL path. The cascaded O-RU 660 may receive Ethernet frames from the south-node 670. The cascaded O-RU 660 may combine IQ data corresponding the same radio resource element from a plurality of eCPRI messages for a UL U-plane of the Ethernet frames and from the air (e.g., information received directly through the air by the cascaded O-RU 660).

In other words, the cascaded O-RU 660 may receive Ethernet frames, identify a portion corresponding to a specific radio resource element in the eCPRI message of the received Ethernet frames, and combine the identified IQ data.

In order for the cascaded O-RU 660 to combine the IQ data, the cascaded O-RU 660 may identify IQ data corresponding to the same radio resource element from information elements. In this case, the information elements may refer, for example, to information of an eCPRI transport header, an application layer common header, and an application layer section field. When transport layer fragmentation occurs, the cascaded O-RU 660 may first reassemble a fragmented message. If compression information exists in eCPRI, the cascaded O-RU 660 may retrieve compression information, e.g., iSample and qSample, and calculate the combined iSample and qSample by individually adding each of iSample and qSample. For example, an algorithm for calculating the compression information by the cascaded O-RU 660 is as shown in Table 2 below.

TABLE 2

If U-Plane data compression is used then
   Combined iSample = Compress (Sum (Decompress
   (iSample_from_south-node) and (iSample_from air))),
   Combined qSample = Compress (Sum (Decompress
   (qSample_from_south-node) and qSample_from air)),
Else
   Combined iSample = Sum (iSample_from_south-node and
   iSample_from air),
   Combined qSample = Sum (qSample_from_south-node and
   qSample_from air),
where
   iSample_from_south-node is the iSample| received from the
   south-node,
   qSample_from_south-node is the iSample received from the
   south-node,
   iSample_from_air is the iSample received from the air, and
   qSample_from_air is the qSample received from the air.

If an overflow occurs in the combine process, iSample and/or qSample may be fixed to the closest value which may be expressed in a compression format used for the combined IQ data. The compression format of the combined IQ data may be the same as the compression format of the IQ data received from the O-RUs.

After the combination is performed, the cascaded O-RU 660 may generate an eCPRI header. In this case, a field (e.g., ecpriSeqid field) generated by the cascaded O-RU 660 is independent, and may be a copy received from the south-node 670. Other fields may also be copies of the field received from the south-node 670. In addition, the cascaded O-RU 660 may add the combined IQ data as an eCPRI message body. The cascaded O-RU 660 may configure Ethernet frames carrying the eCPRI message as a payload. The cascaded O-RU 660 may forward the configured Ethernet frames to the north-node 660.

As described above with reference to FIG. 6A and FIG. 6B, when the FHM 630 or the cascaded O-RU 660 combines the UL U-plane message, information elements required to be checked for are as shown in Table 3 below. Herein, the information elements may be information of an eCPRI transport header, an application layer common header, and an application layer section field.

TABLE 3

| Field | Information element |
|---|---|
| eCPRI transport header | ecpriPcid |
| Application layer common header | dataDirection, frameId, subframeId, slotId, symbolid |
| application layer section field | rb, symInc, startPrbu, numPrbu |

In FIG. 6A and FIG. 6B, the term 'MAC' is illustrated together since the message transmitted through the fronthaul interface between the O-DU and the O-RU is associated with the MAC layer-based Ethernet. Corresponding terms of FIG. 6A and FIG. 6B are not interpreted as limiting communication in other layers according to various embodiments of the disclosure.

Figure 7A:
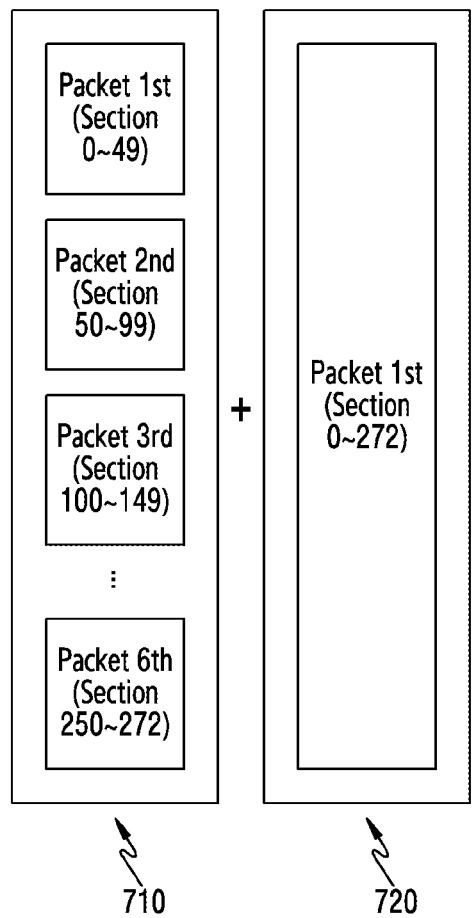
FIG. 7A is a diagram illustrating an example of a time delay caused by Uplink (UL) combining according to various embodiments.
Figure 7B:
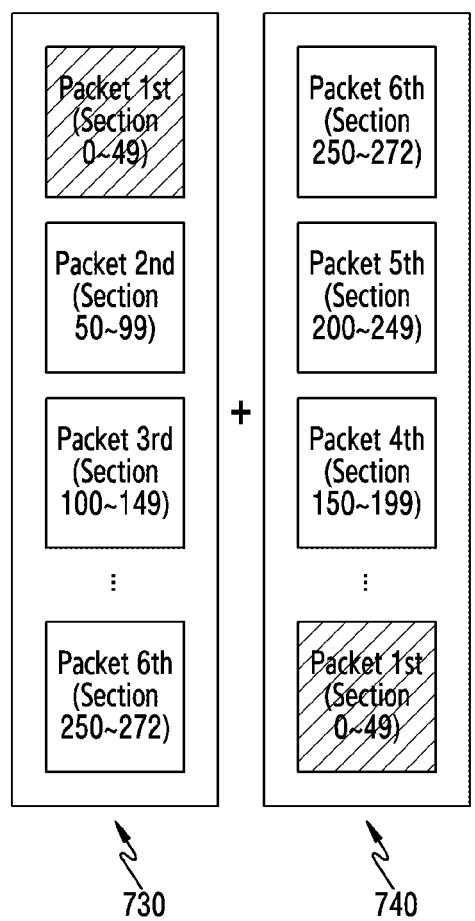
FIG. 7B is a diagram illustrating an example of a time delay caused by UL combining according to various embodiments.
Figure 7C:
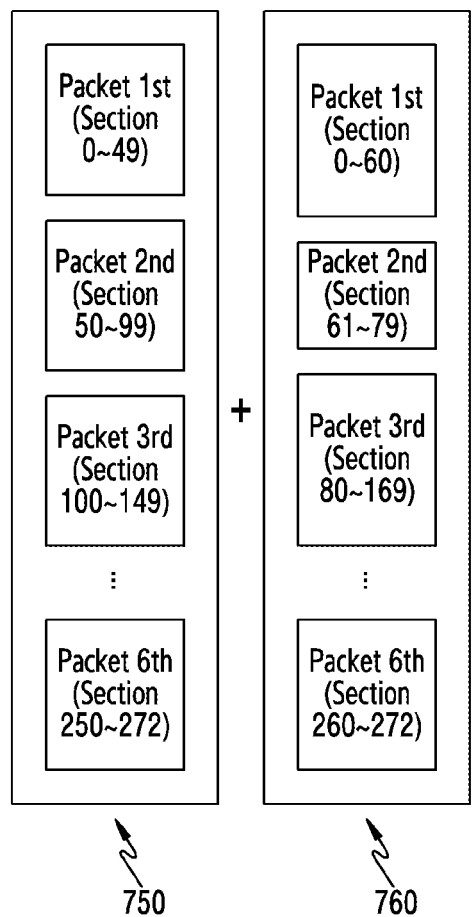
FIG. 7C is a diagram illustrating an example of a time delay caused by UL combining according to various embodiments.

FIG. 7A is a diagram illustrating an example of a time delay caused by UL combining according to various embodiments. FIG. 7B is a diagram illustrating an example of a time delay caused by UL combining according to various embodiments. FIG. 7C is a diagram illustrating an example of a time delay caused by UL combining according to various embodiments.

Although FIGS. 7A, 7B and 7C (which may be referred to as FIGS. 7A to FIG. 7C) illustrate UL data transmission in which at least one uplink packet is transmitted through a specific section, this is only for convenience of explanation, and the disclosure is not limited thereto. Each packet may be transmitted through a plurality of sections. The section may refer, for example, to a unit defined by a time resource (e.g., a symbol, an OFDM symbol) and a frequency resource (e.g., a Resource Block (RB), a Resource Element (RE)). The number of the plurality of sections through which respective packets are transmitted is for example purposes only, and the disclosure is not limited thereto. For example, when a frequency band of 100 MHz is used in an NR communication system, 273 sections in one symbol may be transmitted by being fragmented into a plurality of packets. As another example, when a frequency band of 20 MHz is used, 100 sections in one symbol may be transmitted by being fragmented into a plurality of packets. Hereinafter, the section may be understood to be the same as a PRB in FIG. 7A to FIG. 7C. In other words, one section may correspond to one PRB. However, FIG. 7A to FIG. 7C are for example purposes only, and embodiments of the disclosure are not limited thereto. For example, one section may correspond to an RE, and a packet may be transmitted in a plurality of REs.

In addition, before the description of FIG. 7A to FIG. 7C, UL combining may be performed by an O-RU or an FHM. For example, in a cascade mode, the O-RU may use its own antenna element to perform UL combining on a packet received through the air and a packet received from a south-node (e.g., a different O-RU). As another example, in an FHM mode, the FHM may perform UL combining on respective packets received from the O-RU and the different O-RU.

Referring to FIG. 7A, a first packet set 710 may be a signal received through the air or a signal received from a first O-RU, and a second packet set 720 may be a signal received from a second O-RU. In other words, in case of the cascade mode, the O-RU may receive the first packet set 710 through the air using its own antenna element, and in case of the FHM mode, the FHM may receive the first packet set 710 from the first O-RU. The first packet set 710 may include a plurality of packets. For example, the first packet set 710 may include a first packet including sections 0 to 49, a second packet including sections 50 to 99, a third packet including sections 100 to 149, . . . , a sixth packet including sections 250 to 272. The second packet set 720 may include only one packet. For example, the second packet set 720 may include a first packet including sections 0 to 272. According to FIG. 7A, even if some packets of the first packet set 710 are received, the O-RU or the FHM may not be able to perform UL combining until all sections of the second packet set 720 are received. Accordingly, since the O-RU or the FHM is not able to perform UL combining, a time delay may occur. The time delay of FIG. 7A may refer, for example, to a time delay occurring when the number of packets included in a packet set and the number of sections of each packet are different.

Referring to FIG. 7B, a first packet set 730 may be a packet set received through the air or a packet set received from the O-RU, and a second packet set 740 may be a packet set received from the second O-RU. In other words, in case of the cascade mode, the O-RU may receive the first packet set 730 through the air using its own antenna element, and in case of the FHM mode, the FHM may receive the first packet set 730 from the first O-RU. The first packet set 730 may include a plurality of packets. For example, the first packet set 730 may include a first packet including sections 0 to 49, a second packet including sections 50 to 99, a third packet including sections 100 to 149, . . . , a sixth packet including sections 250 to 272. In addition, the second packet set 740 may also include a first packet including sections 0 to 49, a second packet including sections 50 to 99, a third packet including sections 100 to 149, . . . , a sixth packet including sections 250 to 272. However, the second packet set 740 of FIG. 7B may be transmitted in the order from the sixth packet to the first packet. In other words, the first packet set 730 of FIG. 7B may be transmitted in the order from the first packet to the sixth packet, and the second packet set 740 may be transmitted in the order form the sixth packet to the first packet. According to FIG. 7B, even if some packets of the first packet set 730 are received, the O-RU or the FHM may not be able to perform UL combining until all packets of the second packet set 740 are received, which may result in the occurrence of a time delay. The time delay of FIG. 7B may refer, for example, to a time delay occurring when the orders of packets included in a packet set are different. Although it is illustrated by way of non-limiting example in FIG. 7B that the orders of the first packet set 730 and the second packet set 740 are reversed to each other, it may be understood that all cases where the orders are different are included.

Referring to FIG. 7C, a first packet set 750 may be a packet set received through the air or a packet set received from the O-RU, and a second packet set 760 may be a packet set received from the second O-RU. In other words, in case of the cascade mode, the O-RU may receive the first packet set 750 through the air using its own antenna element, and in case of the FHM mode, the FHM may receive the first packet set 750 from the first O-RU. The first packet set 750 may include a plurality of packets. For example, the first packet set 750 may include a first packet including sections 0 to 49, a second packet including sections 50 to 99, a third packet including sections 100 to 149, . . . , a sixth packet including sections 250 to 272. In addition, the second packet set 760 may also include a first packet including sections 0 to 49, a second packet including sections 50 to 99, a third packet including sections 100 to 149, . . . , a sixth packet including sections 250 to 272. In case of FIG. 7C, each of the first packet set 750 and the second packet set 760 may include 6 packets, and may be transmitted in the same order. However, the number (e.g., range) of sections included in each packet of the first packet set 750 and sections in which each packet of the second packet set 760 may be different. According to FIG. 7C, even if some packets of the first packet set 750 and some packets of the second packet set 760 are received, since a range of sections for respective packets is different in the first packet set 750 and the second packet set 706, the O-RU or the FHM may not be able to perform UL combining until packets including sections of the same range are received. For example, even if all sections of the second packet of the second packet set 760 are received, it is not possible to perform UL combining on sections of the second packet of the second packet set 760 until up to the second packet of the first packet set 750 is received. Therefore, since the O-RU or the FHM is not able to perform UL combining until the same-range sections of the first packet set 750 and second packet set 760 are received, a time delay may occur. Even if the number and order of packets included in the packet set are identical, the time delay of FIG. 7C may refer, for example, to a time delay occurring when a size of each of packets (e.g., the number or range of sections) is different.

As described above, when UL combining of the connection relationship (e.g., the FHM mode or the cascade mode) between the O-DU and the plurality of O-RUs is performed, since the structure and order of packets to be transmitted are different, combining of packets may be delayed. In addition, when transmission to a higher node is required for the combined packets, a transmission timing may also be delayed since the combining of the packets is delayed. In particular, the time delay may be further increased in proportion to an increase in the number of levels of the plurality of O-RUs coupled to the O-DU (e.g., the multi-level connection relationship of FIG. 12). The disclosure describes a technique in which signaling between an O-DU and an O-RU which are in a shared cell relationship is used so that UL data (e.g., packet) has the same structure between the O-RUs, thereby minimizing and/or reducing a time delay caused by UL combining (hereinafter, the technique is called controlling of a packet transmission method for UL combining of the shared cell).

Figure 8:
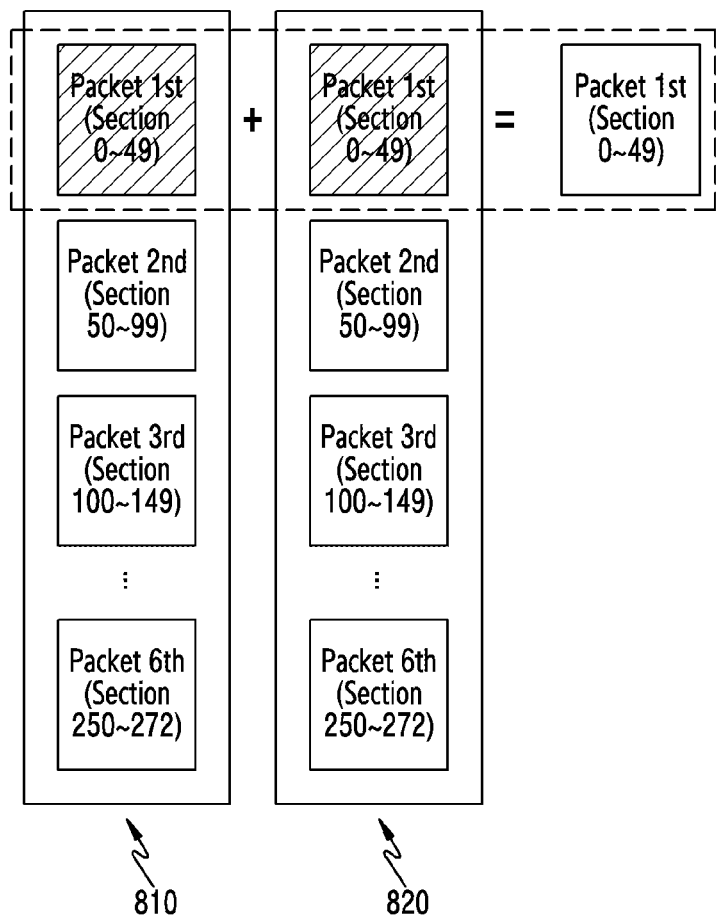
FIG. 8 is a diagram illustrating an example of a UL transmission method of an RU for reducing a time delay caused by UL combining according to various embodiments.

FIG. 8 is a diagram illustrating an example of a UL transmission method of an O-RU for reducing a time delay caused by UL combining according to various embodiments.

Although FIG. 8 illustrates UL data transmission performed through at least one packet, this is only for convenience of explanation, and the disclosure is not limited thereto. Each packet may include a plurality of sections, and the section may refer, for example, to a unit defined by a time resource (e.g., a symbol, an OFDM symbol) and a frequency resource (e.g., a Resource Block (RB), a Resource Element (RE)). The number of the plurality of sections included in each packet is for example purposes only, and the disclosure is not limited thereto. For example, when a frequency band of 100 MHz is used in an NR communication system, 273 sections in one symbol may be transmitted by being fragmented into a plurality of packets. As another example, when a frequency band of 20 MHz is used, 100 sections in one symbol may be transmitted by being fragmented into a plurality of packets. Hereinafter, the section may be understood to be the same as a PRB in FIG. 8. In other words, one section may correspond to one PRB. However, FIG. 8 is for example purposes only, and embodiments of the disclosure are not limited thereto. For example, one section may correspond to an RE, and a packet may be transmitted in a plurality of REs.

UL combining may be performed by an O-RU or an FHM. For example, in a cascade mode, the O-RU may use its own antenna element to perform UL combining on a packet received through the air and a packet received from a south-node (e.g., a different O-RU). As another example, in an FHM mode, the FHM may perform UL combining on respective packets received from the O-RU and the different O-RU.

Referring to FIG. 8, a first packet set 810 may be a packet set received through the air or a packet set received from a first O-RU, and a second packet set 820 may be a packet set received from a second O-RU. In other words, in case of the cascade mode, the O-RU may receive the first packet set 810 through the air using its own antenna element, and in case of the FHM mode, the FHM may receive the first packet set 810 from the first O-RU. The first packet set 810 may include a plurality of packets. For example, the first packet set 810 may include a first packet including sections 0 to 49, a second packet including sections 50 to 99, a third packet including sections 100 to 149, . . . , a sixth packet including sections 250 to 272. In addition, the second packet set 820 may include a first packet including sections 0 to 49, a second packet including sections 50 to 99, a third packet including sections 100 to 149, . . . , a sixth packet including sections 250 to 272. According to FIG. 8, even if only a first packet of the first packet set 810 and a first packet of the second packet set 820 are received, the O-RU or the FHM may perform UL combining. Accordingly, since the O-RU or the FHM is not able to transmit only a combined packet to a higher node (e.g., O-RU or O-DU), a time delay may not occur. In other words, lower nodes fragment packets into the same-sized packets and transmit the fragmented packets according to a predetermined order, so that the higher node is able to perform UL combining for each packet. Therefore, under the control of the packet transmission method for UL combining of a shared cell according to embodiments of the disclosure, a time delay of UL combining and combined data transmission may be reduced.

In case of the UL combining, it is possible to combine only data having the same time and frequency resource on which the data is transmitted. As described in FIG. 7A to FIG. 7C, UL data is transmitted in such a manner that, after waiting until all or corresponding resources are transmitted, transmission to a higher node is performed by performing UL combining thereon. For example, when the lower nodes are in a shared cell relationship, since the frequency resource and the time resource are shared by some or all of O-RUs, a time delay may be further increased. To address this problem, as shown in FIG. 8, signaling between nodes is required so that lower nodes transmit the same-sized packets and each lower node performs transmission according to a determined order. Hereinafter, examples of UL combining and signaling between the O-DU and the O-RU for reducing a time delay of transmission of combined data are described in greater detail below with reference to FIG. 9A and FIG. 9B.

Figure 9A:
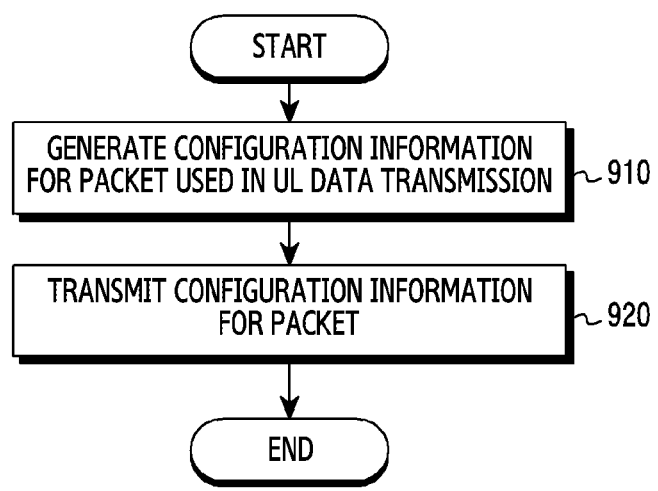
FIG. 9A is a flowchart illustrating an example operation of a DU for controlling a packet transmission method according to various embodiments.

FIG. 9A is a flowchart illustrating an example operation of an O-DU for controlling a packet transmission method according to various embodiments. In order to reduce a time delay caused by UL combining, a method in which an O-DU controls a UL data (e.g., packet) transmission method for each of a plurality of O-RUs of a shared cell through a Management plane (M-plane) is illustrated is FIG. 9A. The flowchart of FIG. 9A may be performed by the DU 160 of FIG. 1B and FIG. 2.

Although not shown in FIG. 9A, the O-DU may receive information on the data transmission method from the O-RU. In other words, the O-DU may receive information on the UL data transmission method from the O-RU through a fronthaul interface. For example, the O-DU may receive the information on the UL data transmission method from the O-RU through an M-plane message. The M-plane message may refer, for example, to a message for non-real-time management operations between the O-DU and the O-RU. In addition, the O-DU may receive the information on the UL data transmission method from the O-RU through a C-plane message. The C-plane message may refer, for example, to a message for real-time control between the O-RU and the O-DU. Herein, the information on the data transmission method may refer, for example, to information on fragment transmission. For example, information on the fragment transmission may refer to whether it is possible to use the fragment transmission. For example, in a UL case, the O-DU may receive, from the O-RU, capability information on whether it is possible to transmit UL data by fragmenting it into a plurality of packets.

In operation 910, the O-DU may generate configuration information for a packet used in UL data transmission. For example, after receiving the information on the data transmission method, the O-DU may generate configuration information for a packet used in UL data transmission of the O-RU. In addition, in operation 910, the O-DU may generate the configuration information for the packet used in the uplink data transmission of the O-RU, in relation to the received information on the data transmission method. When it is identified that the O-RU is able to use fragment transmission based on the received information on the data transmission method, the O-DU may generate configuration information for the packet used in the UL data transmission of the O-RU. According to an embodiment, the O-DU may determine the number and range of frequency resources included in the packet used in the UL data transmission. For example, the O-DU may determine the number and range of Physical Resource Blocks (PRBs) included in each packet. The O-DU may determine the number of packets and the number (e.g., range) of PRBs included in each packet, based on a Subcarrier Spacing (SCS) of a signal used in data transmission and a bandwidth of the signal. For example, when a signal of 20 MHz is used, the number of packets and the number (range) of per-packet PRBs may be determined as shown in Table 4 below.

TABLE 4

| Profile1 | PRB range |
|---|---|
| packet#1 | 0~9 |
| packet#2 | 10~19 |
| packet#3 | 20~29 |
| packet#4 | 30~39 |

TABLE 4-continued

| Profile1 | PRB range |
|---|---|
| packet#5 | 40~49 |
| packet#6 | 50~59 |
| packet#7 | 60~69 |
| packet#8 | 70~79 |
| packet#9 | 80~89 |
| packet#10 | 90~99 |

Referring to Table 4, the number of packets used to fragment and transmit UL data may be determined to be 10, and the range of PRBs included in each packet may be determined to be 10. In Table 4, the range of PRBs included in each packet may refer to an example for indicating the maximum number of per-packet PRBs. In other words, the O-DU may transmit configuration information (shared-cell-config) including information regarding the maximum number of per-packet PRBs to the O-RU through an M-plane message.

In addition, for example, in case of using a signal of 100 MHz, the number of packets and the number (range) of per-packet PRBs may be configured as shown in Table 5 below.

TABLE 5

| Profile2 | PRB range |
|---|---|
| packet#1 | 0~27 |
| packet#2 | 28~55 |
| packet#3 | 56~83 |
| packet#4 | 84~111 |
| packet#5 | 112~139 |
| packet#6 | 140~167 |
| packet#7 | 168~195 |
| packet#8 | 196~223 |
| packet#9 | 224~251 |
| packet#10 | 252~272 |

Referring to Table 5, the number of packets used to transmit UL data may be set to 10, and the range of PRBs included in each packet may be set to 28. In Table 5, the range of PRBs included in each packet may refer to an example for indicating the maximum number of per-packet PRBs. In other words, the O-DU may transmit configuration information (shared-cell-config) including information regarding the maximum number of per-packet PRBs to the O-RU through an M-plane message.

Referring to Table 4 and Table 5, the O-DU may set the maximum number of PRBs included in each packet to a value ranging from 1 to 28, by considering a system configuration state and data capacity. In addition, when the maximum number of per-packet PRBs is N, the DU may configure the 0-RU to generate PRBs 0 to N−1 in the packet #1 and PRBs N to 2N−1 in the packet #2. For a packet to which even one PRB is not allocated, the O-DU may configure the O-RU not to generate the packet. When even one PRB is allocated to the packet, the O-DU may configure the O-RU to generate a packet having a size equal to the maximum number (e.g., range) of PRBs.

In addition, according to an embodiment, the O-DU may determine a transmission order and window of packets used in UL data transmission. For example, the O-DU may configure the O-RU to transmit PRBs having a low number or a low index in the order of packets containing the PRBs. In other words, the O-DU may configure the O-RU to transmit data fragmented into a plurality of packets in an ascending order of a PRB number or a PRB index or a packet number/index. However, this does not limit embodiments of the disclosure, and the O-DU may configure the O-RU to transmit data in a descending order. In addition, the O-DU may determine a size for a transmission window or reception window of the O-RU.

In operation 920, the O-DU may transmit configuration information for a packet. In other words, the O-DU may transmit the determined configuration information for the packet to the O-RU of a shared cell. Herein, the determined configuration information for the packet may include at least one of the number of packets, the number and range of per-packet frequency resources, a transmission order of packets, and a window size.

Although the process in which the O-DU generates the configuration information for the packet used in UL data transmission and transmits the determined configuration information of the packet to the O-RU pf the shared cell is described in FIG. 9A, the disclosure is not limited thereto. For example, in the FHM mode, the O-DU may generate configuration information for a packet for a plurality of O-RUs of a shared cell, and may transmit the configuration information of the packet to each of the plurality of O-RUs through the FHM. In addition, in the cascade mode, the O-DU may generate configuration information for a packet used in UL transmission of O-RUs of a shared cell, and may transmit the configuration information for the packet to an O-RU coupled to at least one O-RUs in a cascade chain and an O-RU coupled at a place farthest from the O-DU. As another example, in case of the multi-level FHM mode as described in greater detail below with reference to FIG. 12, the O-DU may generate configuration information for a packet transmitted to an FHM at an upper-end from an FHM at a lower end, and may transmit the generated configuration information for the packet to the FHM. It may be understood that the aforementioned operations include a process in which the O-DU receives capability information for UL data transmission from the O-RUs of the shared cell.

Figure 9B:
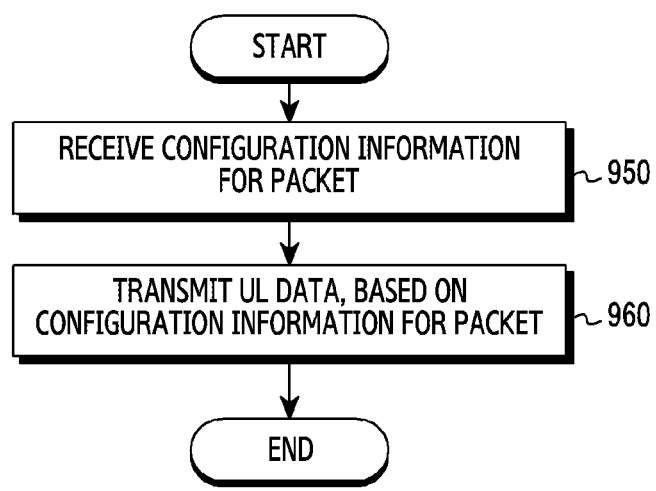
FIG. 9B is a flowchart illustrating an example operation of an RU for controlling a packet transmission method according to various embodiments.
Figure 12:
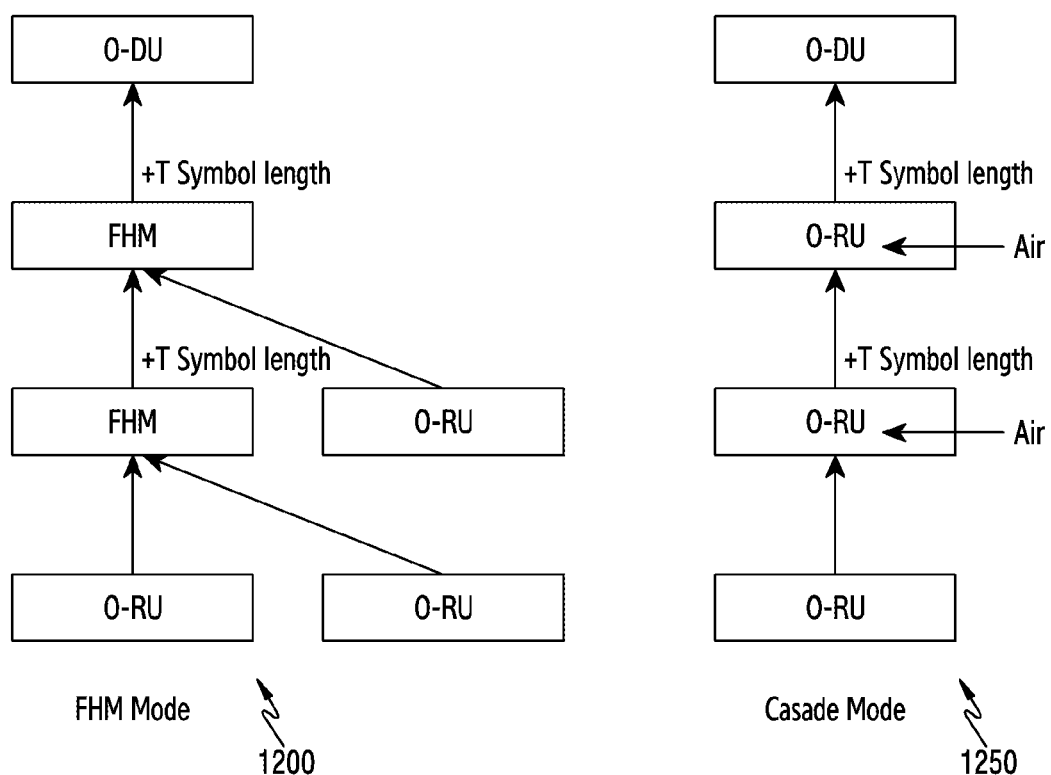
FIG. 12 is a diagram illustrating an example of a time margin in a multi-level connection relationship between an O-DU and an O-RU according to various embodiments.

FIG. 9B is a flowchart illustrating an example operation of an O-RU for controlling a packet transmission method according to various embodiments. In order to reduce a time delay caused by UL combining, a method in which an O-DU receives configuration information on a UL data (e.g., packet) transmission method for each of a plurality of O-RUs of a shared cell through a Management plane (M-plane) and transmits the UL data based on the received configuration information is illustrated is FIG. 9B. The flowchart of FIG. 9B may be performed by the RU 180 of FIG. 1B and FIG. 3. In addition, in the multi-level FHM mode as shown in FIG. 12 below, the flowchart of FIG. 9B may also be performed by the FHM at the lower end.

Although not shown in FIG. 9B, the O-RU may transmit information on the data transmission method to the O-DU. In other words, the O-RU may transmit information on the UL data transmission method to the O-DU through a fronthaul interface. For example, the O-RU may transmit the information on the UL data transmission method to the O-DU through an M-plane message. The M-plane message may refer, for example, to a message for non-real-time management operations between the O-DU and the O-RU. In addition, the O-RU may transmit the information on the UL data transmission method to the O-DU through a C-plane message. The C-plane message may refer, for example, to a message for real-time control between the O-RU and the O-DU. Herein, the information on the data transmission method may refer, for example, to information on fragment transmission. For example, information on the fragment transmission may refer, for example, to whether it is possible to use the fragment transmission. For example, in a UL case, the O-RU may transmit, to the O-DU, capability information on whether it is possible to transmit UL data by fragmenting it into a plurality of packets.

In operation 950, the O-RU may receive the configuration information for the packet. In other words, the O-RU may receive the configuration information for the generated packet from the O-DU. Herein, the configuration information for the packet may include at least one of the number of packets, the number and range of per-packet frequency resources, a transmission order of packets, and a window size.

In operation 960, the O-RU may transmit UL data, based on the configuration information for the packet. Based on the configuration information for the packet received from the O-DU in operation 950, the O-RU may generate at least one packet for transmitting UL data, and may transmit the UL data to the O-DU with the generated at least one packet. In this case, the O-RU may transmit at least one packet, based on the number of packets for fragmenting and transmitting the UL data, a size of the packet (e.g., the number and range of per-packet frequency resources), a transmission order of the packet, and a window size.

Although the process in which the O-RU receives the configuration information of the packet for the UL data from the O-DU and transmits the UL data based on the received configuration information of the packet is described in FIG. 9B, the disclosure is not limited thereto. For example, in the FHM mode, each of a plurality of O-RUs of a shared cell may receive configuration information for a packet through the FHM and transmit UL data through the FHM. In addition, in the cascade mode, the O-RU may receive configuration information of a packet for UL data transmission from at least one O-RU in a cascade chain or the O-DU and transmit the UL data based on the received configuration information for the packet. In this case, an O-RU disposed to a farthest place may receive the configuration information of the packet from the O-DU through the at least one O-RU of the cascade chain and transmit the UL data to the O-RU. As another example, in case of the multi-level FHM mode as described in FIG. 12 below, the flowchart of FIG. 9B may be performed by an FHM at a lower end. It may be understood that the aforementioned operations include a process in which the O-RUs of the shared cell transmit capability information for UL data transmission to the O-DU.

Figure 10:
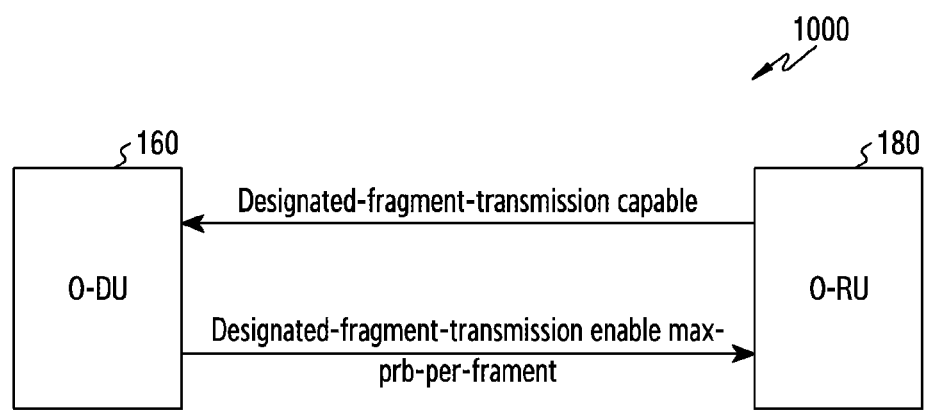
FIG. 10 is a signal flow diagram illustrating an example operation of signaling on a Management plane (M-plane) between an O-DU and an O-RU according to various embodiments.

FIG. 10 is a signal flow diagram an example of performing signaling on an M-plane between an O-DU and an O-RU according to various embodiments. An example for signaling performed by an O-DU 160 and an O-RU 180 through a fronthaul of a base station 1000 is illustrated in FIG. 10. The O-DU 160 may refer, for example, to the DU 160 of FIG. 1B and FIG. 2, and the O-RU 180 of FIG. 10 may refer, for example, to the RU 180 of FIG. 1B and FIG. 3. For example, the descriptions on the DU 160 and RU 180 may be equally applied respectively to the O-DU 160 and O-RU 180 of FIG. 10. Although an O-DU and O-RU of an O-RAN standard are illustrated as an example in FIG. 12 for convenience of explanation, it will be understood that the following description may also be equally applied to a DU and RU of 3GPP.

Referring to FIG. 10, the base station 1000 may include a fronthaul structure between the O-DU 160 and the O-RU 180. According to an embodiment, the O-RU 180 may transmit information on whether fragment transmission is used to the O-DU 160. The O-RU 180 may transmit to the O-DU 160 the information on whether fragment transmission is used as a message through an M-plane. The message including the information on whether the fragment transmission is used may be included in a module for a shared cell of an O-RAN. The module for the shared cell of the O-RAN may be configured as shown in Table 6 below.

TABLE 6

```
module: o-ran-shared-cell
+--rw shared-cell
   +--ro shared-cell-module-cap
   |  +--ro t-copy                              uint32
   |  +--ro t-combine                           uint32
   |  +--ro ta3-prime-max-upper-range           uint32
   |  +--ro max-number-node-copy-and-combine    uint8
   |  +--ro max-number-eaxcid-copy              uint8
   |  +--ro max-number-eaxcid-combine           uint8
   |  +--ro designated-fragment-transmission    boolean
   |  +--ro max-number-eaxcid-combine           uint8
   |  +--ro compression-method-supported* [ ] {FHM}?
   |     +--ro iq-bitwidth?                     uint8
   |     +--ro compression-type                 enumeration
   |     x--ro bitwidth?                        uint8
```

Referring to Table 6, the O-RU 180 may transmit to the O-DU 160 a module for a shared cell including a message (designated-fragment-transmission) regarding whether fragment transmission is used.

According to an embodiment, the O-DU 160 may determine the maximum number of frequency resources per unit, for data fragment transmission, based on the information regarding whether fragment transmission is used, received from the O-DU 180. The O-DU 160 may transmit to the O-RU 180 the configuration information regarding the determined maximum number of frequency resources per unit through an M-plane message. According to an embodiment, the configuration information regarding the maximum number of frequency resources per unit for fragment transmission may be included in shared cell configuration (shared-cell-config) of the M-plane message. For example, when the O-RU 180 identifies that the fragment transmission is possible for UL data, the O-DU 160 may determine the maximum number of per-packet PRBs, and may transmit to the O-RU 180 the configuration information regarding the determined maximum number of per-packet PRBs. The shared cell configuration transmitted by the O-DU 160 may be configured as shown in Table 7 below.

TABLE 7

```
+--rw shared-cell-config
   +--rw (shared-cell-copy-combine-mode)?
      +--:(COMMON)
      |  +--rw shared-cell-copy-entities+ [name]
      |  |  +--rw name                                       string
      |  |  +--rw north-node-processing-element? ->
      |  |        /o-ran-pe:processing-elements/ru-elements/name
      |  |  +--rw south-node-processing-elements* ->
      |  |        /o-ran-pe:processing-elements/ru-elements/name
      |  |  +--rw shared-cell-copy-uplane-config {FHM}?
      |  |     +--rw tx-eaxc-id* [eaxc-id]
      |  |     |  +--rw eaxc-id                              uint16
      |  |     +--rw rx-eaxc-id* [eaxc-id]
      |  |     |  +--rw eaxc-id                              uint16
      |  |     +--rw downlink-radio-frame-offset             uint32
      |  |     +--rw downlink-sfn-offset                     int16
      |  +--rw shared-cell-combine-entities* [name]
      |     +--rw name                                       string
      |     +--rw north-node-processing-element? ->
      |     |     /o-ran-pe:processing-elements/ru-elements/name
      |     +--rw south-node-processing-elements* ->
      |     |     /o-ran-pe:processing-elements/ru-elements/name
      |     +--rw ta3-prime-max?                             uint32
```

TABLE 7-continued

```
      |     +--rw designated-fragment-transmission?          boolean
      |     +--rw max-prb-per-fragment                       uint16
      |     +--rw shared-cell-combine-uplane-config {FHM}?
      |        +--rw rx-eaxc-id* [eaxc-id]
      |        |  +--rw eaxc-id                              uint16
      |        |  +--rw comression-method
```

Referring to Table 7, the O-DU 160 may identify whether fragment transmission is used and transmit configuration information on the maximum number of PRBs per fragment transmission unit (e.g., packet) in the shared cell configuration. The O-DU 160 may indicate the maximum number of PRBs for each of packets used in fragment transmission through various methods. For example, the O-DU 160 may indicate the maximum number of per-packet PRB s through the packet size. In addition, the O-DU 160 may indicate the maximum number of per-packet PRBs through the PRB range.

According to FIG. 8 to FIG. 10, in UL data transmission of the O-RU, the O-DU may set the number of packets to be fragmented and transmitted, the number and range of per-packet frequency resources, a transmission order of the packet, and a transmission/reception window for the O-RUs of a shared cell. Through the setting, the O-DU or a higher node (FHM or O-RU) may perform UL combining without a time delay. For example, in case of the FHM mode, a plurality of O-RUs may transmit UL data to the FHM, based on the setting for UL data transmission. The FHM may perform the UL combining for part (e.g., packet) of the received UL data, even if the UL data received from the plurality of O-RUs is not entirely received. In addition, in case of the cascade mode, the O-RU may receive the UL data from a south-node and the air, based on the setting for UL data transmission. The O-RU may perform the UL combining for part (e.g., packet) of the UL data, even if the UL data received from the south-node and the air is not entirely received. Therefore, a time delay in the UL combining may be reduced through a packet configuration and method for UL combining of the shared cell of the disclosure. The content regarding the reducing of the time delay in the UL combining will be described in greater detail with reference to FIG. 11 and FIG. 12.

Figure 11:
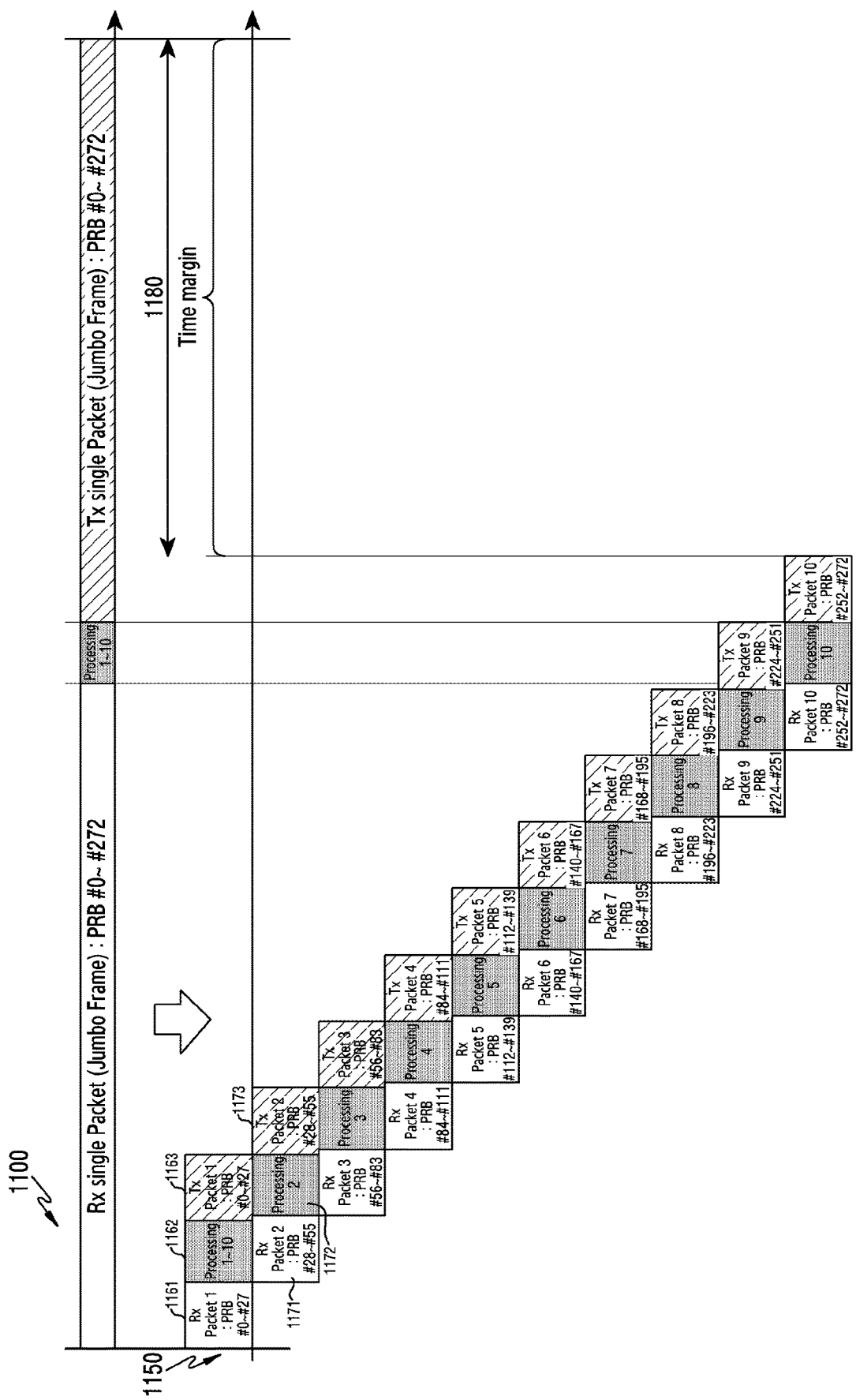
FIG. 11 is a diagram illustrating an example of a time margin based on a method for reducing a time delay occurring by UL combining according to various embodiments.

FIG. 11 is a diagram illustrating an example of a time margin based on a method for reducing a time delay occurring by UL combining according to various embodiments. The time margin may refer, for example, to a temporal margin occurring when reducing a time delay by controlling a packet transmission method for UL combining of a shared cell of the disclosure. The operation of FIG. 11 may be performed by a node (FHM or O-RU) performing the UL combining. Herein, the node performing the UL combining may be referred to as a reference node.

FIG. 11 illustrates a processing operation 1100 when UL data is transmitted with one packet and a processing operation 1150 when UL data is transmitted with 10 packets.

Referring to the operation 1100, one packet may include 273 PRBs. The operation 1100 may include an operation in which the reference node receives one packet from each of lower nodes (a south-node and air or a plurality of O-RUs), performs processing on the received packet, and transmits again the processed one packet. Herein, the processing may refer, for example, to UL combining. Referring to operation 1150, one packet may be fragmented to include up to 28 PRBs. In other words, the 273 PRBs may be transmitted/received by being fragmented into 10 packets (a last packet includes 21 PRBs). In the operation 1150, the reference node may receive a first packet from each of lower nodes (see 1161), perform processing on the received packet (see 1162), and transmit the processed first packet again (see 1163). While performing the processing (see 1162), the reference node may receive a second packet (see 1171). While transmitting the processed first packet (see 1163), the reference node may perform processing (see 1172). Referring to the operation 1150, the reference node may perform receiving, processing, and transmitting on 10 packets step-by-step. Comparing the operation 1100 and the operation 1150, in the receiving, combining, and transmitting of same 273 PRBs (e.g., UL data), the operation 1150 may be performed faster by a time margin 1180 than the operation 1100. In other words, the time delay in the UL combining may be reduced through the packet configuration and method for UL combining of the shared cell of the disclosure.

FIG. 12 is a diagram illustrating an example for a time margin in a multi-level connection relationship between an O-DU and an O-RU according to various embodiments. Herein, multi-level may refer, for example, to a case where a connection is achieved with a structure including a plurality of levels between O-RUs and O-DU in a shared cell relationship. Although an O-DU and O-RU of an O-RAN standard are illustrated as an example in FIG. 12 for convenience of explanation, it is understood that the following description may also be equally applied to a DU and RU of 3GPP.

A case of a multi-level connection relationship in an FHM mode 1200 and a case of a multi-level connection relationship in a cascade mode 1250 are illustrated in FIG. 12.

Referring to the FHM mode 1200, the O-DU may be coupled to the O-RUs through an FHM at an upper end and an FHM at a lower end. For example, the O-DU may be coupled to at least one O-RU of a second level and the FHM at the lower end through the FHM of a first level, and the FHM at the lower end may be coupled to a plurality of O-RUs of a third level. Herein, the O-RUs of the second and third levels may be in a shared cell relationship. Similarly, referring to the cascade mode 1250, the O-DU may be coupled to O-RUs of the first level, O-RUs of the second level, and O-RUs of the third level in a multi-level manner. Herein, the O-RUs of the first to third levels may be in a shared cell relationship.

In case of using a packet configuration and method for uplink combination of a shared cell of the disclosure, there may be a time margin to the extent of T symbols in uplink data transmission from the third level to the second level, and there may be a time margin to the extent of T symbols again in uplink data transmission from the second level to the first level. Herein, it may be understood that the T symbols are generalization of the time margin 1180 of FIG. 11. For example, in case of using the conventional method, a time margin may be increased proportionally due to a multi-level connection relationship between the O-DU and the O-RU. Using a packet configuration and method for uplink combination of a shared cell according to embodiments of the disclosure, the time margin may be obtained effectively in the multi-level connection relationship.

According to an example embodiment of the disclosure, a method performed by a Distributed Unit (DU) may include: generating configuration information for packets used in uplink data transmission of a plurality of Radio Units (RUs) providing a shared cell, and transmitting the configuration information for packets to an RU among the plurality of RUs through a fronthaul interface. The configuration information for packets may include information for indicating the number of per-packet Physical Resource Blocks (PRBs) for the uplink packets.

In an example embodiment, the number of per-packet PRBs may be indicated by a range of the per-packet PRBs.

In an example embodiment, the number of per-packet PRBs may include the maximum number of PRBs usable for each packet when the RU transmits packets used in the uplink data transmission.

In an example embodiment, the DU and the RU may be coupled through a Fronthaul Multiplexer (FHM) or a different RU. The FHM and the different RU may include the shared cell.

In an example embodiment, the method may further include receiving capability information for the uplink data transmission of the RU, from the RU through the fronthaul interface.

In an example embodiment, the method may further include determining the number of packets used in the uplink data transmission of the RU, and transmitting information on the determined number of packets to the RU.

In an example embodiment, the number of packets may be determined based on a bandwidth and Subcarrier Spacing (SCS) of a signal for transmitting uplink data.

In an example embodiment, the method may further include determining a transmission order of packets used in the uplink data transmission of the RU, and transmitting information on the determined transmission order of packets to the RU.

In an example embodiment, the transmission order of the packets may be set in the order from a packet having a low PRB number to a packet having a high PRB number among the packets used for the uplink data transmission.

According to an example embodiment of the disclosure, a method performed by an RU may include: receiving configuration information for packets used in uplink data transmission of the RU, from a DU through a fronthaul interface, and transmitting uplink data, based on the received configuration information for packets. The configuration information for packets may include information for indicating the number of per-packet Physical Resource Blocks (PRBs) for the uplink packets. The RU may be included in a plurality of RUs providing a shared cell.

In an example embodiment, the number of per-packet PRBs may be indicated by a range of the per-packet PRBs.

In an example embodiment, the number of per-packet PRBs may include the maximum number of PRBs usable for each packet when the RU transmits packets used in the uplink data transmission.

In an example embodiment, the DU and the RU may be coupled through an FHM or a different RU. The FHM and the different RU may include the shared cell.

In an example embodiment, the method may further include transmitting capability information for the uplink data transmission of the RU, to the DU through the fronthaul interface.

In an example embodiment, the method may further include receiving information on the determined number of packets from the DU.

In an example embodiment, the number of packets may be determined based on a bandwidth and SCS of a signal for transmitting uplink data.

In an example embodiment, the method may further include receiving information on the determined transmission order of packets from the DU.

In an example embodiment, the transmission order of the packets may be set in the order from a packet having a low PRB number to a packet having a high PRB number among the packets used for the uplink data transmission.

According to an example embodiment of the disclosure, a DU may include: a transceiver, and at least one processor operatively coupled to the transceiver. The at least one processor may be configured to: generate configuration information for packets used in uplink data transmission of a plurality of RUs providing a shared cell, and transmit the configuration information for packets to an RU among the plurality of RUs through a fronthaul interface. The configuration information for packets may include information for indicating the number of per-packet PRBs for the uplink packets.

In an example embodiment, the number of per-packet PRBs may be indicated by a range of the per-packet PRBs.

In an example embodiment, the number of per-packet PRBs may include the maximum number of PRBs usable for each packet based on the RU transmitting packets used in the uplink data transmission.

In an example embodiment, the DU and the RU may be coupled through an FHM or a different RU. The FHM and the different RU may include the shared cell.

In an example embodiment, the at least one processor may be further configured to receive capability information for the uplink data transmission of the RU, from the RU through the fronthaul interface.

In an example embodiment, the at least one processor may be further configured to: determine the number of packets used in the uplink data transmission of the RU, and transmit information on the determined number of packets to the RU. The number of packets may be determined based on a bandwidth and SCS of a signal for transmitting uplink data.

In an example embodiment, the at least one processor may be further configured to determine a transmission order of packets used in the uplink data transmission of the RU, and transmit information on the determined transmission order of packets to the RU.

In an example embodiment, the transmission order of the packets may be set in the order from a packet having a low PRB number to a packet having a high PRB number among the packets used for the uplink data transmission.

Methods based on the embodiments disclosed in the claims and/or the disclosure may be implemented in hardware, software, or a combination of both.

When implemented in software, computer readable recording medium for storing one or more programs (e.g., software modules) may be provided. The one or more programs stored in the computer readable recording medium are configured for execution performed by one or more processors in the electronic device. The one or more programs include instructions for allowing the electronic device to execute the methods based on the embodiments of the disclosure.

The program (e.g., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned example embodiments of the disclosure, a component included in the disclosure is expressed in a singular or plural form according to the specific embodiment disclosed herein. However, the singular or plural expression is selected properly for a situation disclosed for the convenience of explanation, and thus the various embodiments of the disclosure are not limited to a single or a plurality of components. Therefore, a component expressed in a plural form may also be expressed in a singular form, or vice versa.

While the disclosure has been illustrated and described with reference to various example embodiments thereof, it will be understood that the various example embodiments are intended to be illustrative, not limiting. It will be further understood by those skilled in the art that various changes in form and detail may be made therein departing from the true spirit and full scope of the disclosure including the appended claims and their equivalents. It will also be understood that any of the embodiment(s) described herein may be used in conjunction with any other embodiment(s) described herein.

What is claimed is:

1. A method performed by a Distributed Unit (DU), comprising:
   generating configuration information for packets used in uplink data transmission of a plurality of Radio Units (RUs) providing a shared cell; and
   transmitting the configuration information for packets to an RU among the plurality of RUs through a fronthaul interface,
   wherein the configuration information for packets includes information for indicating the number of per-packet Physical Resource Blocks (PRBs) for the uplink packets.

2. The method of claim 1, wherein the number of per-packet PRBs is indicated by a range of the per-packet PRBs.

3. The method of claim 1, wherein the number of per-packet PRBs comprises the maximum number of PRBs usable for each packet based on the RU transmitting packets used in the uplink data transmission.

4. The method of claim 1,
   wherein the DU and the RU are coupled through a Fronthaul Multiplexer (FHM) or a different RU, and
   wherein the FHM and the different RU include the shared cell.

5. The method of claim 1, further comprising receiving capability information for the uplink data transmission of the RU, from the RU through the fronthaul interface.

6. The method of claim 1, further comprising:
   determining the number of packets used in the uplink data transmission of the RU; and
   transmitting information on the determined number of packets to the RU.

7. The method of claim 6, wherein the number of packets is determined based on a bandwidth and Subcarrier Spacing (SCS) of a signal for transmitting uplink data.

8. The method of claim 1, further comprising:
   determining a transmission order of packets used in the uplink data transmission of the RU; and transmitting information on the determined transmission order of packets to the RU.

9. The method of claim 8, wherein the transmission order of the packets is set in the order from a packet having a low PRB number to a packet having a high PRB number among the packets used for the uplink data transmission.

10. A method performed by a Radio Unit (RU), comprising:
receiving configuration information for packets used in uplink data transmission of the RU, from a Distributed Unit (DU) through a fronthaul interface; and
transmitting uplink data, based on the received configuration information for packets,
wherein the configuration information for packets includes information indicating a number of per-packet Physical Resource Blocks (PRBs) for the uplink packets, and
wherein the RU is included in a plurality of RUs providing a shared cell.

11. The method of claim 10, wherein the number of per-packet PRBs is indicated by a range of the per-packet PRBs.

12. The method of claim 10, wherein the number of per-packet PRBs includes the maximum number of PRBs usable for each packet based on the RU transmitting packets used in the uplink data transmission.

13. The method of claim 10,
wherein the DU and the RU are coupled through a Fronthaul Multiplexer (FHM) or a different RU, and
wherein the FHM and the different RU include the shared cell.

14. The method of claim 10, further comprising transmitting capability information for the uplink data transmission of the RU, to the DU through the fronthaul interface.

15. The method of claim 10, further comprising receiving information on the determined number of packets from the DU.

16. The method of claim 15, wherein the number of packets is determined based on a bandwidth and Subcarrier Spacing (SCS) of a signal for transmitting uplink data.

17. The method of claim 10, further comprising receiving information on the determined transmission order of packets from the DU.

18. The method of claim 17, wherein the transmission order of the packets is set in the order from a packet having a low PRB number to a packet having a high PRB number among the packets used for the uplink data transmission.

19. A Distributed Unit (DU) comprising:
a transceiver; and
at least one processor operatively coupled to the transceiver,
wherein the at least one processor is configured to:
generate configuration information for packets used in uplink data transmission of a plurality of Radio Units (RUs) providing a shared cell; and
transmit the configuration information for packets to an RU among the plurality of RUs through a fronthaul interface,
wherein the configuration information for packets includes information indicating a number of per-packet Physical Resource Blocks (PRBs) for the uplink packets.

20. The DU of claim 19, wherein the number of per-packet PRBs is indicated by a range of the per-packet PRBs.

* * * * *